United States Patent [19]
Watanabe

[11] Patent Number: 4,471,610
[45] Date of Patent: Sep. 18, 1984

[54] SOOT CATCHER PURGATIVE DIESEL ENGINE INTAKE THROTTLE VALVE CONTROL METHOD AND APPARATUS WITH GRADUATED HOMING PERFORMANCE

[75] Inventor: Noboru Watanabe, Toyota, Japan

[73] Assignee: Toyota Jidosha Kabushiki Kaisha, Toyota, Japan

[21] Appl. No.: 429,016

[22] Filed: Sep. 30, 1982

[30] Foreign Application Priority Data

Apr. 28, 1982 [JP] Japan .................................. 57-72029

[51] Int. Cl.³ ............................................. F01N 3/02
[52] U.S. Cl. ...................................... 60/274; 60/311; 123/399
[58] Field of Search ......................... 60/274, 285, 311; 123/341, 376, 399, 400, 401, 403

[56] References Cited

U.S. PATENT DOCUMENTS 4,211,075  7/1980  Ludecke ................................ 60/303
4,353,339 10/1982  Collonia .............................. 123/399

Primary Examiner—Douglas Hart
Attorney, Agent, or Firm—Oblon, Fisher, Spivak, McClelland & Maier

[57] ABSTRACT

A method for controlling intake throttling for a diesel engine provided with an exhaust gas soot catcher, which also has an intake throttling valve for restricting intake air, thus heating the exhaust gases for purging the soot catcher. The intake throttling valve is controlled by selecting a target opening amount for the intake throttling valve, and by altering the actual opening amount of the intake throttling valve, if substantially different from this target opening amount, in the direction of the target opening amount. The rate of change of the actual opening amount of the intake throttling valve is made to be greater when the difference between the actual opening amount of the intake throttling valve and the target opening amount for the intake throttling valve is greater, and is smaller when the difference between the actual opening amount of the intake throttling valve and the target opening amount is smaller. Apparatus is also described for controlling an intake throttling valve in this manner.

2 Claims, 3 Drawing Figures

SOOT CATCHER PURGATIVE DIESEL ENGINE INTAKE THROTTLE VALVE CONTROL METHOD AND APPARATUS WITH GRADUATED HOMING PERFORMANCE

BACKGROUND OF THE INVENTION

The present invention relates to a method for controlling an intake throttling valve for a diesel internal combustion engine, and, more particularly, relates to a novel method for controlling an intake throttling valve for a diesel internal combustion engine which is fitted with a soot catcher of a per se well known sort, so as efficiently to purge the soot catcher by operating the intake throttling valve to an appropriate amount, without running the risk of slow responsiveness, or of causing the emission of smoke and soot. The present invention also relates to apparatus for performing the above mentioned diesel internal combustion engine intake throttling valve control method.

Nowadays, it is common and conventional to provide a soot catcher to the exhaust system of a diesel internal combustion engine. Such a soot catcher catches and accumulates carbon particles and other solid particles present in the exhaust gases of the diesel internal combustion engine, and prevents their escape to the atmosphere. Since it is becoming more and more realized nowadays that such soot particles such as carbon particles may present a significant health hazard to the public, the provision of such a soot catcher is very important from the environmental and public health point of view.

Such a soot catcher normally has a filter like structure for catching the soot particles, and naturally this filter structure inevitably tends to become clogged up, over a long period of use of the soot catcher, with an accumulation of soot particles, chiefly carbon particles. When this happens, not only does the efficiency of the soot catcher for purifying the exhaust gases of the diesel internal combustion engine of soot particles contained therein drop drastically, but also the resistance of the soot catcher to the flow therethrough of exhaust gases increases, which deteriorates the actual operation of the diesel internal combustion engine, causing its breathing efficiency to drop, which causes a loss of engine power. This has presented a serious problem with regard to such a soot catcher: either it has been necessary to regularly remove the soot catcher in order to clean it, which is dirty, expensive, and troublesome; or some system has had to be provided for cleaning or purging the soot catcher in situ, without removing it from the engine.

It is possible to purge such a soot catcher by burning out the combustible soot particles such as carbon particles which are clogging the filter structure of the soot catcher by increasing the temperature of the exhaust gases passing through the soot catcher above the ignition temperature of said combustible soot particles.

During normal operation of the diesel internal combustion engine, when the load on the diesel internal combustion engine rises to a high load level wherein the excess air ratio in the exhaust gases becomes small, it is quite possible for the temperature of the exhaust gases passing through the filter structure of the soot catcher to spontaneously rise above the ignition temperature of the soot particles clogging the soot catcher, without the provision of any special means for raising the temperature of said exhaust gases. In this case, purging of the soot catcher as described above may spontaneously occur, by burning out said soot particles lodged therein as a clogging accumulation. However, this spontaneous self purging process cannot be relied upon. Diesel engines, especially in automotive vehicles, are only irregularly operated in high load conditions; and when an automotive vehicle is being operated in urban traffic it is quite unusual for the diesel internal combustion engine thereof to be operated in the high load operational region. Thus such spontaneous self purging of a soot catcher might not occur in time to purge the soot catcher before its clogging had unacceptably deteriorated the functioning of the diesel internal combustion engine to which it was fitted. Therefore it is necessary to practice some particular special and reliable method for raising the temperature of the exhaust gases of the diesel internal combustion engine to a temperature higher than the ignition temperature of the soot particles which are becoming lodged in the soot catcher thereof, in order reliably to purge said soot catcher whenever it becomes clogged.

A first such prior art method for raising the temperature of the exhaust gases of a diesel internal combustion engine to a temperature higher than the ignition temperature of the soot particles which are becoming lodged in the soot catcher thereof in order to purge said soot catcher has been to delay the timing of fuel injection to the diesel internal combustin engine.

However, this first prior art soot catcher purging method has suffered from the disadvantage that the temperature of the exhaust gases of the diesel internal combustion engine can only be so raised when the engine is operating in a certain range of operational conditions; in other engine operational conditions the temperature of the exhaust gases does not rise up sufficiently to combust the soot particles in the soot catcher, even when fuel injection timing is delayed. Further, delaying the timing instant of fuel injection may hamper the operability of the diesel internal combustion engine, and the drivability of a vehicle to which it is fitted. Accordingly this first purging method is not of very good applicability.

A second such prior art method for raising the temperature of the exhaust gases of a diesel internal combustion engine to a temperature higher than the ignition temperature of the soot particles which are becoming lodged in the soot catcher thereof in order to purge said soot catcher has been to provide a separate heater, such as an oil burner or other heating device, for heating the exhaust gas up.

However, this second prior art soot catcher purging method has suffered from disadvantages related to cost, safety, and durability. In practice this solution cannot practicably be used for a diesel internal combustion engine for use in an automotive vehicle.

A third per se well known prior art method for raising the temperature of the exhaust gases of a diesel internal combustion engine to a temperature higher than the ignition temperature of the soot particles which are becoming lodged in the soot catcher thereof in order to purge said soot catcher has been to reduce the amount of excess air which is supplied to the combustion chambers of the diesel internal combustion engine, by limiting the air intake of the engine, as for example by the use of an intake throttling valve or choke valve.

A problem that has arisen with the third per se well known prior art purging method is that it is subject to the limitation that the temperature of the exhaust gases of the diesel internal combustion engine can only be so raised so as to purge the soot catcher when the engine is operating in a certain range of operational conditions; in other engine operational conditions the temperature of the exhaust gases does not rise up sufficiently to combust the soot particles in the soot catcher, even when the air intake amount of the engine is limited as by the aforesaid intake throttling valve. Further, attention must be paid to the engine operational condition, when practicing this intake throttling method for purging the soot catcher, in order not to run the risk of emission of large quantities of soot and black smoke. In other words, the amount of throttling for the intake passage which is provided by the intake throttling valve must be properly adjusted according to engine operational conditions.

Now, a particular sort of method for raising the temperature of the exhaust gases of a diesel internal combustion engine to a temperature higher than the ignition temperature of the soot particles which are becoming lodged in the soot catcher thereof in order to purge said soot catcher, in which the amount of excess air which is supplied to the combustion chambers of the diesel internal combustion engine is limited by limiting the air intake of the engine by the use of an intake throttling valve has been to provide an intake throttling valve which can be positioned not only to two extreme positions but also to intermediate positions. In other words, the intake throttling valve has been controllable to any of a range of positions thereof between its fully opened (i.e. substantially non intake throttling) position and its fully closed (i.e. maximum intake throttling) position. Typically, in fact, such an intake throttling valve has been positionable to any of a continuous range of positions between said two extreme positions.

The use of such a continuously variable position intake throttling valve is very helpful with regard to securing a good and appropriate amount of intake throttling for a diesel internal combustion engine, but its control presents some difficulties. First, a typical method of controlling such a continuously variable position intake throttling valve has been to provide some means for determining a target value for the amount of opening of said intake throttling valve, said target value being determined according to the current values of various operating parameters of the diesel internal combustion engine, such as for example engine load, engine revolution speed, engine cooling water temperature, and/or the like. The actual amount of opening of the intake throttling valve is sensed by some kind of per se well known intake throttling opening amount sensor, and then the intake throttling valve is controlled by a control system so as to bring its amount of opening to be equal to said target opening value, said control by said control system being based upon a feedback process utilizing the output signal of said intake throttling opening amount sensor. In other words, the control system attempts to bring the difference between the actual amount of opening of the intake throttling valve as measured by said intake throttling opening amount sensor and the target value of opening of said intake throttling valve to zero, or approximately zero.

This sort of control, on the one hand, presents the difficulty, if the rate of movement of the intake throttling valve, i.e. the speed of bringing the opening amount of said intake throttling valve towards the target value for said opening amount, is high, that overshooting of the actual target amount for the opening amount of said intake throttling valve is likely, end thus a lot of hunting will inevitably occur. This can cause trouble with regard to the drivability and operability of the diesel internal combustion engine, and also with regard to its durability. However, such a control method has good responsiveness. On the other hand, if the rate of movement of the intake throttling valve, i.e. the speed of bringing the opening amount of said intake throttling valve towards the target value for said opening amount, is low, then, although no such problems with overshooting and/or hunting are likely, this control method can be attended with the difficulty that slowness in bringing the actual intake throttling valve opening amount to be substantially equal to the target amount for said opening amount of said intake throttling valve is likely, and thus poor responsiveness of the control system will inevitably occur. This can cause trouble with regard to emission of black smoke during operation of the diesel internal combustion engine, especially during sudden acceleration episodes of operation of the diesel internal combustion engine, in which case there is the risk of the emission of large quantities of soot and black smoke, which can be quite unacceptable with regard to the standards for quality of exhaust emissions, which are becoming more and more severe nowadays, and with regard to the safety of the public.

Therefore, a requirement has arisen for a method and apparatus for so controlling the soot purgative operation of an intake air throttling valve for a diesel internal combustion engine which will assure that the intake throttling valve is quickly and yet stably brought to its appropriate opening amount, for various operating circumstances of the diesel internal combustion engine.

SUMMARY OF THE INVENTION

Accordingly, it is the primary object of the present invention to provide a method for controlling an intake throttling valve which is provided in the intake passage of a diesel internal combustion engine equipped with a soot catcher, said intake throttling valve being positionable to an intermediate position as well as to its two extreme positions, which avoids the above identified problems, and can properly choke the intake passage of the diesel internal combustion engine so as effectively to purge the soot catcher, to an appropriate amount, without causing the emission of smoke and soot and without disturbing operation of the diesel internal combustion engine.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, which can position said intake throttling valve reliably to a target position, in order to purge said soot catcher, without the occurrence of hunting in the positioning of said intake throttling valve.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, which can position said intake throttling valve reliably to a target position, in order to purge said soot catcher, without the occurrence of overshooting in the positioning of said intake throttling valve.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, which can position said intake throttling valve reliably to a target position, in order to purge said soot catcher, and which provides a good and a quick response in the positioning of said intake throttling valve.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, which can when required reliably and properly heat up the soot catcher so as to purge it by combusting any accumulation of soot particles which has built up in it.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, with which the efficiency and effectiveness of purging the soot catcher are kept as high as possible.

It is a further object of the present invention to provide a method for controlling an intake throttling valve which is provided in the intake passage of a diesel internal combustion engine equipped with a soot catcher, said intake throttling valve being positionable to an intermediate position as well as to its two extreme positions, in which such throttling to cause purging and regeneration of the soot catcher, when such purging is needed for said soot catcher, is performed only when the operational circumstances of the diesel internal combustion engine are in fact appropriate for such throttling.

It is a further object of the present invention to provide a method for controlling an intake throttling valve which is provided in the intake passage of a diesel internal combustion engine equipped with a soot catcher, for purging the soot catcher, said intake throttling valve being positionable to an intermediate position as well as to its two extreme positions, which does not run any substantial risk of the emission of significant quantities of soot and smoke in the exhaust of said diesel internal combustion engine.

It is a further object of the present invention to provide a method for controlling an intake throttling valve which is provided in the intake passage of a diesel internal combustion engine equipped with a soot catcher, for purging the soot catcher, said intake throttling valve being positionable to an intermediate position as well as to its two extreme positions, which does not run any substantial risk of the emission of significant quantities of soot and smoke in the exhaust of said diesel internal combustion engine during rapid accelerational episodes in the operation of said diesel internal combustion engine.

It is a further object of the present invention to provide a method for controlling an intake throttling valve which is provided in the intake passage of a diesel internal combustion engine equipped with a soot catcher, for purging the soot catcher, said intake throttling valve being positionable to an intermediate position as well as to its two extreme positions, which does not present any problems due to safety of the exhaust emissions thereof.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which does not deteriorate the operability of the diesel internal combustion engine.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which does not deteriorate the drivability of a vehicle incorporating the diesel internal combustion engine.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which does not deteriorate the environmental acceptability of a vehicle incorporating the diesel internal combustion engine.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which is cheap and easy to apply.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which is not pregnant with risks as to safety.

It is a yet further object of the present invention to provide such a method for controlling an intake throttling valve which is provided in the intake passage of a diesel internal combustion engine equipped with a soot catcher, said intake throttling valve being positionable to an intermediate position as well as to its two extreme positions, for purging the soot catcher, which is not likely to encounter problems with regard to durability.

It is a yet further object of the present invention to provide an apparatus for controlling an intake throttling valve which is provided in the intake passage of a diesel internal combustion engine equipped with a soot catcher, said intake throttling valve being positionable to an intermediate position as well as to its two extreme positions, for purging the soot catcher, which achieves the above described objects, and others.

Now, according to the most general method aspect of the present invention, these and other objects are accomplished by, for a diesel internal combustion engine comprising a soot catcher and an air intake passage which can be selectively throttled so as to purge said soot catcher by the operation of an intake throttling valve which is provided therein: a method of controlling said intake throttling valve, wherein a target opening amount for said intake throttling valve is selected, and the actual opening amount of said intake throttling valve, if substantially different from said target opening amount for said intake throttling valve, is altered in the direction of said target opening amount for said intake throttling valve, the rate of change of said actual opening amount of said intake throttling valve being greater when the difference between said actual opening amount of said intake throttling valve and said target opening amount for said intake throttling valve is greater, and being smaller when the difference between said actual opening amount of said intake throttling valve and said target opening amount for said intake throttling valve is smaller.

According to such a method, the occurrence of hunting in the control of said intake throttling valve is made much less likely, since when the actual amount of opening of said intake throttling valve approaches close to the desired or target amount of opening of said intake throttling valve the speed of alteration of said actual amount of opening of said intake throttling valve is made less than when the actual amount of opening of said intake throttling valve is far distant from its target value. Thereby, the risk of overshooting is also reduced. This is done without sacrificing the speed of response of the control system, and thus the danger of emitting substantial amounts of black smoke and soot in the exhaust of the diesel internal combustion engine, especially during rapid acceleration episodes in the operation thereof, is made less likely. Further, the drivability and the operability of the diesel internal combustion engine are preserved. This is done without sacrificing any safety aspects of the diesel internal combustion engine, and without any risk of deterioration of the quality of the exhaust emissions thereof.

According to a more particular method aspect of the present invention, those of these objects relating to a method, and others, are accomplished by, for a diesel internal combustion engine comprising a soot catcher and an air intake passage which can be selectively throttled so as to purge said soot catcher by the operation of an intake throttling valve which is provided therein: a method of controlling said intake throttling valve, wherein a target opening amount for said intake throttling valve is selected, and the actual opening amount of said intake throttling valve, if substantially different from said target opening amount for said intake throttling valve, is altered in the direction of said target opening amount for said intake throttling valve, the rate of change of said actual opening amount of said intake throttling valve being greater when the difference between said actual opening amount of said intake throttling valve and said target opening amount for said intake throttling valve is greater than a certain predetermined value, and being smaller when the difference between said actual opening amount of said intake throttling valve and said target opening amount for said intake throttling valve is smaller than said certain predetermined value.

According to such a method, the advantages explained above are gained by a particularly simple procedure, the discrimination regarding the amount of difference between said actual value of the opening of said intake throttling valve and said target value for the opening of said intake throttling valve being a simple one relating to said difference simply being greater or less than said certain predetermined value.

According to another more particular method aspect of the present invention, those of these objects relating to a method, and other, are accomplished by, for a diesel internal combustion engine comprising a soot catcher and an air intake passage which can be selectively throttled so as to purge said soot catcher by the operation of an intake throttling valve which is provided therein: a method of controlling said intake throttling valve, wherein a target opening amount for said intake throttling valve is selected, and the actual opening amount of said intake throttling valve, if substantially different from said target opening amount for said intake throttling valve, is altered in the direction of said target opening amount for said intake throttling valve, the rate of change of said actual opening amount of said intake throttling valve being substantially equal to a first greater value when the difference between said actual opening amount of said intake throttling valve and said target opening amount for said intake throttling valve is greater than a certain predetermined value, and being substantially equal to a first smaller value when the difference between said actual opening amount of said intake throttling valve and said target opening amount for said intake throttling valve is smaller than said certain predetermined value.

According to such a method, the advantages explained above are gained by a particularly simple procedure, the discrimination regarding the amount of difference between said actual value of the opening of said intake throttling valve and said target value for the opening of said intake throttling valve being a simple one relating to said difference simply being greater or less than said certain predetermined value, and the setting of the actual rate of change of said actual opening amount of said intake throttling valve also being particularly simple, since substantially only two values are involved to which said rate of change is to be set.

Now, according to the most general apparatus aspect of the present invention, these and other objects are accomplished by, for a diesel internal combustion engine comprising a soot catcher and an air intake passage which can be selectively throttled so as to purge said soot catcher by the operation of an intake throttling valve which is provided therein: apparatus for controlling said intake throttling valve, comprising: a mechanism for selectively positioning said intake throttling valve to a set of positions including a first position in which said intake throttling valve throttles said intake passage to a relatively large amount and a second position in which said intake throttling valve throttles said intake passage to a relatively small amount and at least one position intermediate between said first position and said second position, according to a control signal which said mechanism receives; and a control system for said mechanism for positioning said intake throttling valve, which selects a target opening amount for said intake throttling valve, and, if the actual opening amount of said intake throttling valve is substantially different from said target opening amount for said intake throttling valve, controls said mechanism for positioning said intake throttling valve so as to cause it to move said intake throttling valve so that the opening amount of said intake throttling valve is altered in the direction of said target opening amount of said intake throttling valve, the rate of change of said actual opening amount of said intake throttling valve being greater when the difference between said actual opening amount of said intake throttling valve and said target opening amount for said intake throttling valve is greater, and being smaller when the difference between said actual opening amount of said intake throttling valve and said target opening amount for said intake throttling valve is smaller.

According to such an apparatus, as will be understood from what follows, the occurrence of hunting in the control of said intake throttling valve is made much less likely, since when the actual amount of opening of said intake throttling valve approaches close to the desired or target amount of opening of said intake throttling valve the speed of alteration of said actual amount of opening of said intake throttling valve is made less than when the actual amount of opening of said intake throttling valve is far distant from its target value. Thereby, the risk of overshooting is also reduced. This is done without sacrificing the speed of response of the control system, and thus the danger of emitting substantial amounts of black smoke and soot in the exhaust of the diesel internal combustion engine, especially during rapid acceleration episodes in the operation thereof, is made less likely. Further, the drivability and the operability of the diesel internal combustion engine are preserved. This is done without sacrificing any safety aspects of the diesel internal combustion engine, and without any risk of deterioration of the quality of the exhaust emissions thereof.

According to a more particular apparatus aspect of the present invention, those of these objects relating to an apparatus, and others, are accomplished by, for a diesel internal combustion engine comprising a soot catcher and an air intake passage which can be selectively throttled so as to purge said soot catcher by the operation of an intake throttling valve which is provided therein: apparatus for controlling said intake throttling valve, comprising: a mechanism for selectively positioning said intake throttling valve to a set of positions including a first position in which said intake throttling valve throttles said intake passage to a relatively large amount and a second position in which said intake throttling valve throttles said intake passage to a relatively small amount and at least one position intermediate between said first position and said second position, according to a control signal which said mechanism receives; and a control system for said mechanism for positioning said intake throttling valve, which selects a target opening amount for said intake throttling valve, and, if the actual opening amount of said intake throttling valve is substantially different from said target opening amount for said intake throttling valve, controls said mechanism for positioning said intake throttling valve so as to cause it to move said intake throttling valve so that the opening amount of said intake throttling valve is altered in the direction of said target opening amount of said intake throttling valve, the rate of change of said actual opening amount of said intake throttling valve being greater when the difference between said actual opening amount of said intake throttling valve and said target opening amount for said intake throttling valve is greater than a certain predetermined value, and being smaller when the difference between said actual opening amount of said intake throttling valve and said target opening amount for said intake throttling valve is smaller than said certain predetermined value.

According to such a structure, the advantages explained above are gained by a particularly simple procedure, the discrimination regarding the amount of difference between said actual value of the opening of said intake throttling valve and said target value for the opening of said intake throttling valve being a simple one relating to said difference simply being greater or less than said certain predetermined value.

According to another more particular apparatus aspect of the present invention, those of these objects relating to an apparatus, and others, are accomplished by, for a diesel internal combustion engine comprising a soot catcher and an air intake passage which can be selectively throttled so as to purge said soot catcher by the operation of an intake throttling valve which is provided therein: apparatus for controlling said intake throttling valve, comprising: a mechanism for selectively positioning said intake throttling valve to a set of positions including a first position in which said intake throttling valve throttles said intake passage to a relatively large amount and a second position in which said intake throttling valve throttles said intake passage to a relatively small amount and at least one position intermediate between said first position and said second position, according to a control signal which said mechanism receives; and a control system for said mechanism for positioning said intake throttling valve, which selects a target opening amount for said intake throttling valve, and, if the actual opening amount of said intake throttling valve is substantially different from said target opening amount for said intake throttling valve, controls said mechanism for positioning said intake throttling valve so as to cause it to move said intake throttling valve so that the opening amount of said intake throttling valve is altered in the direction of said target opening amount of said intake throttling valve, the rate of change of said actual opening amount of said intake throttling valve being substantially equal to a first greater value when the difference between said actual opening amount of said intake throttling valve and said target opening amount for said intake throttling valve is greater than a certain predetermined value, and being substantially equal to a first smaller value when the difference between said actual opening amount of said intake throttling valve and said target opening amount for said intake throttling valve is smaller than said certain predetermined value.

According to such a structure, the advantages explained above are gained by a particularly simple procedure, the discrimination regarding the amount of difference between said actual value of the opening of said intake throttling valve and said target value for the opening of said intake throttling valve being a simple one relating to said difference simply being greater or less than said certain predetermined value, and the setting of the actual rate of change of said actual opening amount of said intake throttling valve also being particularly simple, since substantially only two values are involved to which said rate of change is to be set.

Further, according to a particular aspect of the present invention, these and other objects relating to an apparatus are more particularly and concretely accomplished by an apparatus of any one of the sorts described above, wherein said mechanism for selectively positioning said intake throttling valve comprises a diaphragm actuator within which there is defined a diaphragm chamber, a first electrically controlled switching valve which according to an electrical signal supplied to it selectively admits vacuum into said diaphragm chamber of said diaphragm actuator, and a second electrically controlled switching valve which according to an electrical signal supplied to it selectively admits atmospheric air into said diaphragm chamber of said diaphragm actuator; said control system for said mechanism for positioning said intake throttling valve supplying said electrical signals to said first and second electrically controlled switching valves, the duty ratios of said electrical signals thus supplied to said first and second electrically controlled switching valves being altered by said control system so as to alter the vacuum value in said diaphragm chamber of said diaphragm actuator and so as to alter the position of said intake throttling valve.

According to such a structure, the actual position of the intake throttling valve may be easily and conveniently adjusted, simply by varying the duty ratio of one or the other or both of these electrical signals which are supplied to the first and the second electrically controlled switching valves. Thus this construction is particularly adapted to simple implementation, which is important for minimizing cost and ensuring good reliability.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
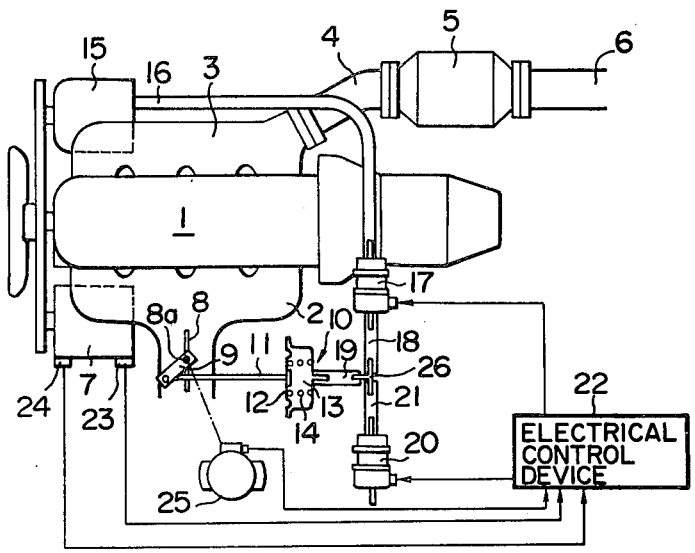
FIG. 1 is a schematic structural view, showing the general structure of a diesel internal combustion engine, incorporating a soot catcher, which is equipped with the preferred embodiment of the intake throttling valve control apparatus according to the present invention, for practicing the preferred embodiment of the intake throttling valve control method according to the present invention.

The present invention will now be described with reference to the preferred embodiment thereof, and with reference to the appended drawings. In FIG. 1, which is a schematic structural view, the reference numeral 1 generally denotes the diesel internal combustion engine, which is exemplarily a four cylinder in line type diesel internal combustion engine, and which comprises an air intake manifold and passage 2, an exhaust manifold 3, and an exhaust pipe 4, which are all per se well known in their structures and functions. The diesel internal combustion engine 1 further has a crankshaft, four cylinders, four pistons sliding reciprocatingly in the cylinders, and four combustion chambers defined above the pistons in the cylinders: none of these elements are shown in the figure. Air is sucked in by the diesel internal combustion engine 1 through the intake manifold and passage 2, into the combustion chambers, and liquid diesel fuel at high pressure is injected into these combustion chambers to be mixed with the thus sucked in air at appropriate timing points by a fuel injection pump 7 which will be described later. After combustion has occurred in the combustion chambers and has powered the pistons and the crankshaft in a per se well known way, the resulting exhaust gases are exhausted from the combustion chambers of the diesel internal combustion engine 1 into the exhaust manifold 3, from which they flow in turn to the exhaust pipe 4 connected to said exhaust manifold 3, which in turn leads to the inlet side of a soot catcher 5, the outlet side of which is connected to a second exhaust pipe 6 which leads to the atmosphere.

The soot catcher 5 is of the above described per se well known sort, which incorporates a filter structure for catching the soot particles present in the exhaust gases passing therethrough; and which is however somewhat prone to becoming clogged up after a long period of service. In more detail, the soot catcher 5 is adapted to catch the combustible solid particles such as carbon particles present in the exhaust gases passing therethrough, while allowing substantially free flow of said exhaust gases therethrough. Such a soot catcher 5 may comprise a filter structure including a multi screen element which is made of ceramic or metal held within a casing of stainless steel or other heat resistant material able to withstand the temperature of the hot exhaust gases passing through the soot catcher 5. It is generally preferable to coat such a multi screen element with a catalyst for catalyzing the combustion of whatever combustible materials may be present in the exhaust gases.

Powering injection of fuel for the diesel internal combustion engine 1 is provided from a fuel injection pump 7, which may be a per se well known Bosch type VE fuel injection and distribution pump, and which typically comprises a drive shaft which is rotated via a driving belt and a pulley by the crankshaft (not shown) of the diesel internal combustion engine 1 and which is maintained in a predetermined definite rotational phase relationship with respect to said crankshaft, and a fuel metering and distribution device which supplies metered powering pulses of diesel fuel at high pressure at correct timing points to the four combustion chambers, not shown, via fuel injection pipes and fuel injectors, also not shown. The amount of each of these powering pulses of injected diesel fuel is determined by said fuel metering and distribution device in such a way that it increases according to increase in the desired load on the diesel internal combustion engine 1, and in more detail is determined in relation to the movement of a control element which is moved by a linkage, not shown in the drawing, which connects said linkage to an accelerator pedal of the vehicle (also not shown in the drawing) in a per se well known way. Also, possibly, the fuel metering and distribution device may be moved in relation to the action of a governor of a per se well known sort, which may be incorporated in the fuel injection pump 7. Thus the amount of fuel injected to each of the combustion chambers, in each powering pulse, may be controlled according to the amount of depression of said accelerator pedal, and also according to the speed of rotation of the drive shaft of said main fuel injection pump 7, and increases with increase in engine load. To the fuel injection pump 7 there are attached an engine load sensor 23 and an engine revolution speed sensor 24, and these sensors provide electrical output signals representative respectively of the current values of vehicle engine load and crankshaft revolution speed of the diesel internal combustion engine 1. No particular structures are shown in the figure or further discussed here for the engine load sensor 23 and the engine revolution speed sensor 24, for providing these electrical output signals, because such means are per se well known and conventional in various different forms.

In the intake manifold and air intake passage 2 there is provided an intake throttling butterfly valve, which is designated by the reference numeral 8 in the figure, and which is located at an intermediate point of said air intake passage 2. This butterfly valve 8 is pivoted within the air intake passage 6 about a rotational axis 8a, and is rotationally coupled to one end of a drive lever 9. The left hand end in the figure of an actuating rod 11 is coupled to the free end of this drive lever 9, and the right hand end in the figure of this actuating rod 11 is drivingly connected to the diaphragm 12 of a diaphragm actuator 10 for the butterfly valve 8. A diaphragm chamber 13 is defined within the diaphragm actuator 10, to the right of the diaphragm 12 in the figure, and this diaphragm chamber 13 is connected to an output arm of a T junction 26 which will be explained later; and thus the diaphragm chamber 13 is provided via the vacuum conduit 19 with the vacuum value present at said T junction 26, which as will be understood hereinafter is a mixture of vacuum selectively admitted thereto through a first electrically actuated switching valve 17 and air at atmospheric pressure selectively admitted thereto through a second electrically actuated switching valve 20, both of which will be described in detail hereinafter. In the diaphragm chamber 13 there is provided a compression coil spring 14, which biases said diaphragm 12 and said actuating rod 11 to the left in the figure so as to bias the butterfly valve 8 in the clockwise direction as seen in the figure against a stop member, not shown, which prevents said butterfly valve 8 moving in the clockwise direction past its position as seen in the figure, i.e. past the position of said butterfly valve 8 in which it provides minimum resistance to flow of intake air in the intake manifold and air intake passage 2. Thus, the greater is the value of the depression below the current value of atmospheric pressure of the vacuum present within the vacuum conduit 19 and supplied to within the diaphragm chamber 13, the more is the diaphragm 12 moved to the right from the point of view of the figure against the biasing action of the compression coil spring 14 which is overcome, the more is the butterfly valve 8 rotated in the counterclockwise direction as seen in the figure, and the greater is the choking resistance which said butterfly valve 8 provides to flow of intake air of the diesel internal combustion engine 1 through the intake manifold and air intake passage 2; and, vice versa, the less is the vacuum present within the vacuum conduit 19 and supplied to within the diaphragm chamber 13, the more is the diaphragm 12 moved to the left from the point of view of the figure according to the biasing action of the compression coil spring 14, the more is the butterfly valve 8 rotated in the clockwise direction as seen in the figure, and the less is the choking resistance which said butterfly valve 8 provides to flow of intake air of the diesel internal combustion engine 1 through the intake manifold and air intake passage 2. An intake throttling valve opening amount sensor 25, which may be of a per se well known type of construction which will not be further enlarged upon here, is provided for sensing the current opening amount of said intake manifold butterfly valve 8, and produces an electrical output signal representative of said current opening amount of said intake manifold butterfly valve 8, i.e. representative of the amount of throttling or choking being provided for the intake manifold and passage 2 by said intake throttling butterfly valve 8, said electrical output signal being fed to an electrical control device 22 which will be described later with regard to its function.

A vacuum pump 15 is provided to said diesel internal combustion engine 1 and is driven from the crankshaft thereof, in fact in the shown preferred embodiment, by the same belt as is used for driving the fuel injection pump 7, although of course this is not essential to the present invention, so that the vacuum pump 15 is arranged to generate a continuous supply of vacuum whenever the diesel internal combustion engine 1 is runnng. This vacuum pump 15 generates a supply of substantially constant vacuum of a fairly high vacuum value, i.e. fairly much depressed below the current value of atmospheric pressure. This vacuum thus generated by this vacuum pump 15 is fed via a vacuum conduit 16 to a vacuum input port of the aforementioned first electrically acutated switching valve 17. The vacuum output port of this first electrically actuated switching valve 17 is communicated via a vacuum conduit 18 to one input arm of the aforementioned T junction 26. On the other hand, the other input arm of the aforementioned T junction 26 is connected via a conduit 21 to the output port of the second electrically actuated switching valve 20, the input port of which is communicated to the atmosphere, possibly via an air filter not shown in the figure.

The first electrically actuated switching valve 17 is of a per se well known type, and includes (for example) a solenoid, and has the aforementioned two ports, a vacuum input port and a vacuum output port. When said solenoid is not supplied with actuating electrical energy, these ports of the first electrically actuated switching valve 17 are not communicated together, but are discommunicated from one another; but, on the other hand, when said solenoid is supplied with actuating electrical energy, these ports are communicated together. This solenoid of the first electrically acutated switching valve 17 is selectively supplied with actuating electrical energy by an electrical control device 22 which will be described shortly with regard to its function. Further, the second electrically actuated switching valve 20, likewise, is of a per se well known type, and includes (for example) a solenoid, and has the aforementioned two ports, an input port and an output port. When said solenoid is not supplied with actuating electrical energy, these ports of the second electrically actuated switching valve 20 are not communicated together, but are discommunicated from one another; but, on the other hand, when said solenoid is supplied with actuating electrical energy, these ports are communicated together. This solenoid of the second electrically actuated switching valve 20 is likewise selectively supplied with actuating electrical energy by the electrical control device 22.

Thus, as will be readily understood, since a constant vacuum supply of a relatively high vacuum value is continuously produced by the vacuum pump 15 and is continuously present within the vacuum conduit 16, in the case that the first electrically actuated switching valve 17 is continuously not supplied with actuating electrical energy by the electrical control device 22, while the second electrically actuated switching valve 20 is continuously supplied with actuating electrical energy by the electrical control device 22, then the vacuum input port of the first electrically actuated switching valve 17 is kept continuously discommunicated from its vacuum output port, and thus no vacuum is transmitted through said first electrically actuated switching valve 17 from the vacuum pump 15 to the T junction 26 to be transmitted to the diaphragm chamber 13 of the diaphragm actuator device 10, while the input port of the second electrically actuated switching valve 20 is kept continuously communicated to its output port, and thus air at atmospheric pressure is transmitted through said second electrically actuated switching valve 20 from the atmosphere to the T junction 26 to be transmitted to the diaphragm chamber 13 of the diaphragm actuator device 10 without being affected by said second electrically actuated switching valve 20, thus causing said diaphragm actuator device 10 to be in the fully relaxed position, with its diaphragm 12 fully displaced in the leftwards direction as seen in the figure by the compression action of the compression coil spring 14, thus turning the intake throttling butterfly valve 8, via the actuating rod 11 and the drive lever 9, to its fully clockwise displaced position as seen in the figure, so as to ensure that minimum intake throttling is being provided for the diesel internal combustion engine 1. On the other hand, in the case that the first electrically actuated switching valve 17 is continuously supplied with actuating electrical energy by the electrical control device 22, while the second electrically actuated switching valve 20 is continuously not supplied with actuating electrical energy by the electrical control device 22, then the vacuum input port of the first electrically actuated switching valve 17 is kept continuously communicated to its vacuum output port, and thus vacuum is transmitted through said first electrically actuated switching valve 17 from the vacuum pump 15 to the T junction 26 to be transmitted to the diaphragm chamber 13 of the diaphragm actuator device 10 without being affected by said first electrically actuated switching valve 17, while the input port of the second electrically actuated switching valve 20 is kept continuously discommunicated from its output port, and thus no air at atmospheric pressure is transmitted through said second electrically actuated switching valve 20 from the atmosphere to the T junction 26 to be transmitted to the diaphragm chamber 13 of the diaphragm actuator device 10, thus causing said diaphragm actuator device 10 to be in the fully operational position, with its diaphragm 12 fully displaced in the rightwards direction as seen in the figure by the suction action of the full vacuum produced by the vacuum pump 15 which is thus transmitted into the diaphragm chamber 13, said suction action working against the compression action of the compression coil spring 14 which is totally overcome, thus turning the intake throttling butterfly valve 8, via the actuating rod 11 and the drive lever 9, to its fully anticlockwise displaced position as seen in the figure, so as to ensure that maximum intake throttling is being provided for the diesel internal combustion engine 1.

Further, in the intermediate case that a particular vacuum value intermediate between the current value of atmospheric pressure and the amount of vacuum needed to provide such maximum intake throttling as detailed above by fully overcoming the compression action of the compression coil spring 14 and by fully moving the butterfly valve 8 in the anticlockwise direction is present within the diaphragm chamber 13 of the diaphragm actuator device 10, then this intermediate vacuum value will cause said diaphragm actuator device 10 to be in the partly relaxed and partly operational position, with its diaphragm 12 partly displaced in the rightwards direction as seen in the figure by the action of said intermediate vacuum present in the diaphragm chamber 13, thus partly overcoming the compression action of the compression coil spring 14 and thus turning the intake throttling butterlfy valve 8, via the actuating rod 11 and the drive lever 9, to its partly anticlockwise displaced position from the point of view of the figure, so as to ensure that a partial amount of intake throttling is being provided for the diesel internal combustion engine 1. Now, if in this condition of the system the electrical control device 22 supplies to the first electrically actuated switching valve 17 a pulsating supply of electrical energy with a certain pulse ratio, i.e. a certain ratio of ON time to OFF time, while also the second electrically actuated switching valve 20 is continuously not supplied with actuating electrical energy by the electrical control device 22, then the vacuum input port of the first electrically actuated switching valve 17 is intermittently communicated to its vacuum output port, i.e. is alternatingly communicated to and discommunicated from said vacuum output port with said certain pulse ratio representing the ratio of communicated to discommunicated time in any particular time period, and thus vacuum is transmitted through said first electrically actuated switching valve 17 via the vacuum conduit 16 from the vacuum pump 15 to the T junction 26 via the vacuum conduit 18 to be transmitted from said T junction 26 via the vacuum conduit 19 to the diaphragm chamber 13 of the diaphragm actuator device 10 with a certain effective flow resistance which is determined by the flow characteristics of the various parts of the system and also by said pulse ratio of the electrical signal supplied by the electrical control device 22 to the first electrically actuated switching valve 17, while on the other hand the input port of the second electrically actuated switching valve 20 is kept continuously discommunicated from its output port and thus no air at atmospheric pressure is transmitted through said second electrically actuated switching valve 20 from the atmosphere via the conduit 21 to the T junction 26 to be transmitted to the diaphragm chamber 13 of the diaphragm actuator device 10. By this action, the vacuum value in the diaphragm chamber 13 of the diaphragm actuator device 10 is gradually increased (i.e. the amount of the depression of the pressure value therein below the current value of atmospheric pressure is gradually increased) at a speed which is determined by said pulse ratio of the electrical signal supplied by the electrical control device 22 to the first electrically actuated switching valve 17, and thereby said diaphragm actuator 10 is caused to be gradually moved towards its more fully operational position, with its diagram 12 gradually more and more fully displaced in the rightwards direction as seen in the figure by the gradually increasing suction action of the thus gradually increasing vacuum within the diaphragm chamber 13, said gradually increasing suction action biasing the diaphragm 12 rightwards in the figure against the compression action of the compression coil spring 14 with a gradually increasing force which thus gradually more and more overcomes the compression action of said compression coil spring 14, thus gradually turning the intake throttling butterfly valve 8, via the actuating rod 11 and the drive lever 9, more and more towards its fully anticlockwise displaced position from the point of view of the figure, and thereby a gradually increasing amount of intake throttling is provided for the diesel internal combustion engine 1. On the other hand, in the contrary case, in this condition of the system wherein a particular vacuum value intermediate between the current value of atmospheric pressure and the amount of vacuum needed to provide such maximum intake throttling as detailed above by fully overcoming the compression action of the compression coil spring 14 and by fully moving the butterfly valve 8 in the anticlockwise direction is present within the diaphragm chamber 13 of the diaphragm actuator device 10, that the electrical control device 22 supplies to the second electrically actuated switching valve 20 a pulsating supply of electrical energy with a certain pulse ratio, i.e. a certain ratio of ON time to OFF time, while also the first electrically actuated switching valve 17 is continuously not supplied with actuating electrical energy by the electrical control device 22, then the input port of the second electrically actuated switching valve 20 is intermittently communicated to its output port, i.e. is alternatingly communicated to and discommunicated from said output port with said certain pulse ratio representing the ratio of communicated to discommunicated time in any particular time period, and thus air at atmospheric pressure is transmitted through said second electrically actuated switching valve 20 via the conduit 21 to the T junction 26 to be transmitted from said T junction 26 via the vacuum conduit 19 to the diaphragm chamber 13 of the diaphragm actuator device 10 with a certain effective flow resistance which is determined by the flow characteristics of the various parts of the system and also by said pulse ratio of the electrical signal supplied by the electrical control device 22 to the second electrically actuated switching valve 20, while on the other hand the vacuum input port of the first electrically actuated switching valve 20 is kept continuously discommunicated from its vacuum output port and thus no supply of vacuum from the vacuum pump 15 and via the vacuum conduit 16 is transmitted through said first electrically actuated switching valve 17 via the vacuum conduit 18 to the T junction 26 to be transmitted to the diaphragm chamber 13 of the diaphragm actuator device 10. By this action, the vacuum value in the diaphragm chamber 13 of the diaphragm actuator device 10 is gradually decreased (i.e. the amount of the depression of the pressure value therein below the current value of atmospheric pressure is gradualy decreased) at a speed which is determined by said pulse ratio of the electrical signal supplied by the electrical control device 22 to the second electrically actuated switching valve 20, and thereby said diaphragm actuator 10 is caused to be gradually moved towards its more fully relaxed position, with its diaphragm 12 gradually more and more fully displaced in the leftwards direction as seen in the figure by the gradually decreasing suction action of the thus gradually decreasing vacuum within the diaphragm chamber 13, said gradually decreasing suction action biasing the diaphragm 12 rightwards in the figure against the compression action of the compression coil spring 14 with a gradually decreasing force which thus gradually less and less overcomes the compression action of said compression coil spring 14, thus gradually turning the intake throttling butterfly valve 8, via the actuating rod 11 and the drive lever 9, more and more towards its fully clockwise displaced position from the point of view of the figure, and thereby a gradually decreasing amount of intake throttling is provided for the diesel internal combustion engine 1.

Yet further, in the case that a particular vacuum value intermediate between the current value of atmospheric pressure and the amount of vacuum needed to provide such maximum intake throttling as detailed above by fully overcoming the compression action of the compression coil spring 14 and by fully moving the butterfly valve 8 in the anticlockwise direction is present within the diaphragm chamber 13 of the diaphragm actuator device 10, with as stated above this intermediate vacuum value causing said diaphragm actuator device 10 to be in the partly relaxed and partly operational position with its diaphragm 12 partly displaced in the rightwards direction as seen in the figure by the action of said intermediate vacuum present in the diaphragm chamber 13 thus partly overcoming the compression action of the compression coil spring 14 and thus turning the intake throttling butterfly valve 8 via the actuating rod 11 and the drive lever 9 to its partly anticlockwise displaced position from the point of view of the figure so as to ensure that a partial amount of intake throttling is being provided for the diesel internal combustion engine 1, and if in this condition of the system the electrical control device 22 both supplies to the first electrically actuated switching valve 17 a pulsating supply of electrical energy with a certain first pulse ratio, i.e. a certain ratio of ON time to OFF time, while also said electrical control device 22 simultaneously supplies to the second electrically actuated switching valve 20 a pulsating supply of electrical energy with a certain second pulse ratio, then the vacuum input port of the first electrically actuated switching valve 17 is intermittently communicated to its vacuum output port, i.e. is alternatingly communicated to and discommunicated from said vacuum output port with said certain first pulse ratio representing the ratio of communicated to discommunicated time in any particular time period, vacuum thus being transmitted as in the previous case through said first electrically actuated switching valve 17 via the vacuum conduit 16 from the vacuum pump 15 to the T junction 26 via the vacuum conduit 18 to be transmitted from said T junction 26 via the vacuum conduit 19 to the diaphragm chamber 13 of the diaphragm actuator device 10 with a certain effective flow resistance which is determined by the flow characteristics of the various parts of the system and also by said first pulse ratio of the electrical signal supplied by the electrical control device 22 to the first electrically actuated switching valve 17, while in a similar way the input port of the second electrically actuated switching valve 20 is intermittently communicated to its ouptput port, i.e. is alternatingly communicated to and discommunicated from said output port with said certain second pulse ratio representing the ratio of communicated to discommunicated time in any particular time period, and thus air at atmospheric pressure is transmitted through said second electrically actuated switching valve 20 via the conduit 21 to the T junction 26 to be transmitted from said T junction 26 via the vacuum conduit 19 to the diaphragm chamber 13 of the diaphragm actuator device 10 with another certain effective flow resistance which is determined by the flow characteristics of the various parts of the system and also by said second pulse ratio of the electrical signal supplied by the electrical control device 22 to the second electrically actuated switching valve 20. As will be readily understood, therefore, the actual rate of change of said particular vacuum value in said pressure chamber 13 of said vacuum actuator 10, and the direction of said change, and the eventual equilibrium value that said vacuum in said pressure chamber 13 reaches, and accordingly the rates of change of, the directions of change of, and the eventual equilibrium amounts of the amount by which said diaphragm actuator 10 is moved from its more fully relaxed position to its more fully operational position (i.e. the eventual equilibrium amount by which its diaphragm 12 is displaced in the rightwards direction as seen in the figure by the suction action of the vacuum within the diaphragm chamber 13 against the compression action of the compression coil spring 14), of the position of the intake throttling butterfly valve 8, and of the amount of intake throttling provided for the diesel internal combustion engine 1, are all determined by the flow characteristics of the system as a whole, and by the values of said first duty ratio and said second duty ratio, i.e. by the values of the duty ratios of the electrical signals supplied to the first electrically actuated switching valve 17 and to the second electrically actuated switching valve 20. The detailed characteristics of these matters will not be explored herein, and cannot in fact be explored without particular data on the performance of any particular proposed system; but it will be remarked in general that the larger is the first duty ratio relative to the second duty ratio, i.e. the larger is the proportion of time in which the first electrically actuated switching valve 17 is opened relative to the proportion of the time that the second electrically actuated switching valve 20 is opened, the higher is the equilibrium vacuum value (i.e. the greater is the amount of depression thereof from the current value of atmospheric pressure) eventually established in the pressure chamber 13 of the vacuum actuator 10 and accordingly the higher is the amount of intake throttling provided for the diesel internal combustion engine 1 by the intake butterfly valve 8; and, vice versa, the smaller is the first duty ratio relative to the second duty ratio, i.e. the smaller is the proportion of time in which the first electrically actuated switching valve 17 is opened relative to the proportion of the time that the second electrically actuated switching valve 20 is opened, the lower is the equilibrium vacuum value (i.e. the less is the amount of depression thereof from the current value of atmospheric pressure) eventually established in the pressure chamber 13 of the vacuum actuator 10 and accordingly the lower is the amount of intake throttling provided for the diesel internal combustion engine 1 by the intake butterfly valve 8. Further, the higher in absolute magnitude is the difference between said first duty ratio and said second duty ratio, approximately, the quicker is any different vacuum value in said pressure chamber 13 from said equilibrium value brought towards said equilibrium vacuum value, either upwards or downwards; and accordingly similarly the quicker is the amount of intake throttling provided for the diesel internal combustion engine 1 by the intake butterfly valve 8 altered towards its equilibrium value, either upwards or downwards.

As stated earlier, the appropriate supply of actuating electrical energy to the first electrically actuated switching valve 17 and to the second electrically actuated switching valve 20, i.e. the supply of an electrical signal whose value varies between high or low (that is, is either ON or OFF) with a characteristic pulse ratio to the first electrically actuated switching valve 17, and/or the supply of another electrical signal whose value varies between high or low (that is, is either ON or OFF) with another characteristic pulse ratio to the second electrically actuated switching valve 20, is made by the electrical control device 22, based upon certain input signals which it receives. In the described and shown preferred embodiment of the intake throttling valve control method and apparatus according to the present invention this electrical control device 22 inputs the aforesaid electrical signal from the engine load sensor 23 which senses the load on the diesel internal combustion engine 1 and which outputs an electrical signal indicative of said engine load, the aforesaid electrical signal from the engine revolution speed sensor 24 which senses the revolution speed of the crankshaft of the diesel internal combustion engine 1 and which outputs an electrical signal indicative of said engine load, and the aforesaid electrical signal from the intake throttling valve opening amount sensor 25 which senses the opening amount or angle of the intake throttling valve 8 of the diesel internal combustion engine 1 and which outputs an electrical signal indicative of said intake valve throttling amount. No particular structure will be described for this electrical control device 22, because, based upon the description of the function thereof given herein, and based upon various forms of prior art diesel intake throttling valve control systems, various possible structures for such an electrical control device 22 can easily be conceived of by one of ordinary skill in the relevant art. For example, the electrical control device 22 might (in fact, in the shown preferred embodiment, it does) comprise a microcomputer with various programs stored in the memory thereof, and might further comprise various analog to digital and digital to analog converters of per se well known sorts which interface between the above described sensors and said microcomputer, and between said microcomputer and said first electrically actuated switching valve 17 and said second electrically actuated switching valve 20; and the details of the control programs for such a microcomputer will be easily conceived of by one of ordinary skill in the microprogramming art, based upon the functional disclosures relating to the overall control function of the electrical control device 22 contained in this specification. Alternatively, the electrical control device 22 might comprise various specialized electronic circuits for performing the functions explained herein and quite possibly other functions which are per se well known; and, again, the details of such specialized electronic circuits will be easily conceived of by one of ordinary skill in the art, based upon the functional disclosures in this specification.

In any case, the electrical control device 22 operates as follows, as it is comprised in the functioning of the shown preferred embodiment of the intake throttling valve control method according to the present invention.

First, the electrical control device 22 determines whether or not the actual amount of opening of the intake throttling butterfly valve 8 is greater than a target value for said opening amount, which according to this first preferred embodiment said electrical control device 22 determines according to a table lookup procedure or the like, although this is not essential to the principle of the present invention. Thus, the electrical control device 22 determines whether in fact it is required to open the intake throttling butterfly valve 8 by a certain amount, or alternatively it is required to close the intake throttling butterfly valve 8 by a certain amount, or alternatively it is not required to change the opening amount of said intake throttling butterfly valve 8 by any substantial amount. In the latter case, nothing needs to be done; but, if it is required to change the amount of opening of the intake throttle butterfly valve 8, then the electrical control device 22 also determines whether or not the actual amount by which said opening amount of said intake throttling butterfly valve 8 is required to be changed is larger than a certain predetermined value A, or not. If it is not, then the electrical control device 22 alters the opening amount of said intake throttling butterfly valve 8 relatively slowly, either upwards or downwards as appropriate; but if in fact the actual amount by which said opening amount of said intake throttling butterfly valve 8 is required to be changed is larger than said certain predetermined value A, then the electrical control device 22 alters the opening amount of said intake throttling butterfly valve 8 relatively quickly, again either upwards or downwards as appropriate. This system of operation makes the occurrence of hunting in the control of said intake throttling valve 8 much less likely, since when the actual amount of opening of said intake throttling valve 8 approaches close to the desired or target amount of opening of said intake throttling valve 8, the speed of alteration of said actual amount of opening of said intake throttling valve 8 is made less than when the actual amount of opening of said intake throttling valve 8 is far distant from its target value. Thereby, the risk of overshooting is also reduced. This is done without sacrificing the speed of response of the control system, and thus the danger of emitting substantial amounts of black smoke and soot in the exhaust of the diesel internal combustion engine 1, especially during rapid acceleration episodes in the operation thereof, is made less likely. Further, the drivability and the operability of the diesel internal combustion engine 1 are preserved. This is done without sacrificing any safety aspects of the diesel internal combustion engine 1, and without any risk of deterioration of the quality of the exhaust emissions thereof.

Now the more detailed operation of the intake throttling valve control apparatus shown in FIG. 1, which is the preferred embodiment of the method according to the present invention, will be described, with reference to the flow chart shown in FIG. 3. In fact, the control device 22 in the shown preferred embodiment of the intake throttling valve control method according to the present invention is a microcomputer which executes a program based upon this flow chart, possibly also performing other regulatory tasks for the diesel internal combustion engine 1 and/or the vehicle incorporating it. The control device 22 continuously receives an electrical signal from the engine load sensor 23 attached to the fuel injection pump 7 representative of engine load, also continuously receives an electrical signal from the engine revolution speed sensor 24 also attached to the fuel injection pump 7 representative of engine rotational speed, and also continuously receives an electrical signal from the engine throttling valve opening amount sensor 25 representative of the opening amount of the intake throttling valve 8, as schematically indicated by directed signal lines in FIG. 1. The control device 22, thus, receives signals representative of engine load, of engine revolution speed, of intake throttling valve opening angle, and possibly also receives other signals representative of other engine operational parameters, and produces a first electrical output signal for controlling the operation of the first electrically actuated switching valve 17 and a second electrical output signal for controlling the operation of the second electrically actuated switching valve 20. The algorithm according to which this is done, and the results thereof, will now be explained, referring to FIG. 3 and also to FIG. 2. It should be understood that the algorithm illustrated by the flow chart of FIG. 3 is executed repeatedly by the control device 22, for example at intervals which are separated by some fairly small fixed time period, or alternatively at intervals which are defined by the rotation of the crankshaft of the diesel internal combustion engine 1 through some predetermined rotational angle, whenever the diesel internal combustion engine 1 is operating. Of course, between repeated executions of this algorithm, the control device 22 may well, and typically in fact will, perform various other computational and/or regulatory tasks for the diesel internal combustion engine 1, of various other sorts. The details of these concurrent tasks will not be allowed to detain us here.

First, when this algorithm is started to be executed, from the START block the flow of control passes to the SET TARGET THROTTLING VALVE OPENING ANGLE $A_T$ block. In this block, the electrical control system 22 determines the appropriate current target value $A_T$ for the amount of opening of the intake throttling butterfly valve 8 from its fully closed position in which it provides maximum intake throttling for the diesel internal combustion engine 1, i.e. for the angle thereof as sensed by the intake throttling valve opening angle sensor 25. This may be performed in any of a number of ways; the exact way in which it is so determined is not directly relevant to the present invention. However, it should be understood that the amount of opening of the intake throttling butterfly valve 8 may be thus determined either to be maximum, or to be minimum, or to be an intermediate amount between the maximum and the minimum; this is a prerequisite for the practice of the present invention. If the amount of opening of the intake throttling butterfly valve 8 could only be determined either to be maximum or to be minimum, but could not be determined to be an intermediate amount between the maximum and the minimum, then there would be no scope for the practice of the present invention, as will be understood from what appears hereinafter.

Now, an explanation will be given as to how, in the case of the preferred embodiment of the intake throttling valve control method and apparatus which is shown and described herein, this target opening amount for the intake throttling butterfly valve 8 is determined by the electrical control device 22. However, this should be understood as only being for the purposes of example, and is not part of the gist of the present invention. In this preferred embodiment, this decision is based upon the current position in a phase space diagrammatically illustrated in FIG. 2 whose dimensions are operational parameters of the diesel internal combustion engine 1—in fact are engine load of the diesel internal combustion engine 1 as indicated to the electrical control device 22 by the electrical output signal from the engine load sensor 23 and engine revolution speed of the diesel internal combustion engine 1 as indicated to the electrical control device 22 by the electrical output signal from the engine revolution speed sensor 24—of the point in said phase space which represents the current operational condition of said diesel internal combustion engine 1. In fact, in the shown preferred embodiment, this phase space is (notionally) divided up into three regions: a first non intake throttling region, the uppermost region in FIG. 2, which represents sets of values for the operational parameters of the diesel internal combustion engine 1 (i.e. for the engine load and engine revolution speed of said diesel internal combustion engine 1) in the case of which minimum intake throttling for the diesel internal combustion engine 1 should be performed, even if it is desired to purge the soot catcher 5, i.e. in the case of which the intake throttling butterfly valve 8 should be positioned to its minimum intake throttling position (i.e. its maximum opening amount) in which it is rotated to the maximum amount in the clockwise direction in FIG. 1 by air at substantially atmospheric pressure being admitted to the diaphragm chamber 13 of the diaphragm actuator 10, so that purging of the soot catcher 5 by throttling of the intake passage of the diesel internal combustion engine 1 cannot be at all performed in these operational conditions for reasons which are per se well known in the art to do with emission of smoke and soot in the exhaust gases of the diesel internal combustion engine 1 and with impairment of the operability and drivability of the diesel internal combustion engine 1; a second intake throttling region, the lowermost region in FIG. 2, which represents sets of values for the operational parameters of the diesel internal combustion engine 1 in the case of which (if it is currently desired to purge the soot catcher 5) maximum intake throttling for the diesel internal combustion engine 1 should be performed, i.e. in the case of which the intake throttling butterfly valve 8 should be positioned to its maximum intake throttling position (i.e. its minimum opening amount) in which it is rotated to the maximum amount in the anticlockwise direction in FIG. 1 by a high amount of vacuum being admitted to the diaphragm chamber 13 of the diaphragm actuator 10, in order to purge the soot catcher 5; and a third or partial intake throttling region, the intermediate region in FIG. 2, which represents sets of values for the operational parameters of the diesel internal combustion engine 1 in the case of which for heating up the exhaust gases of the diesel internal combustion engine 1 and for thus purging the soot catcher 5 a non maximum amount of intake throttling for the diesel internal combustion engine 1 should be performed, i.e. in the case of which, if it is desired to purge the soot catcher 5 by burning up the accumulation of combustible soot particles present in it, the intake throttling butterfly valve 8 should be positioned to an intermediate intake throttling position in which it is rotated to an intermediate non maximum and non minimum amount in the anticlockwise direction in FIG. 1 by an intermediate amount of vacuum being admitted to the diaphragm chamber 13 of the diaphragm actuator 10.

Now, every time or iteration that the algorithm whose flow chart is given in FIG. 3 is obeyed by the electrical control device 22, in this SET TARGET THROTTLING VALVE OPENING ANGLE $A_T$ block, first determines whether in fact it is currently an appropriate time to perform throttling of the intake manifold and passage 2 of the diesel internal combustion engine 1 by the intake throttling butterfly valve 8 in order to heat up the exhaust gases of the diesel internal combustion engine 1 and thereby to purge the soot catcher 5 by burning out the combustible soot particles currently lodged in it, or not. The criterion for this purging decision may be whether or not the crankshaft (not shown) of the diesel internal combustion engine 1 has performed a given (rather large) number of revolutions since the last time that the soot catcher 5 was purged; or alternatively this criterion may be based upon the current value of the pressure in the exhaust pipe 4 upstream of the soot catcher 5, as measured by an appropriate sensor (also not shown). Also, other possible types of such criterion might be envisaged; but this is not strictly relevant to the gist of the present invention. In any case, at this time the electrical control device 22 decides whether the present time point is an appropriate time point for purging the soot catcher 5, i.e. if it is likely that at this present time point the soot catcher 5 is choked up with soot particles to a sufficient amount to require purging. If the result of this decision is negative, i.e. if there is no need to purge the soot catcher 5 at this time, then the electrical control device sets the value $A_T$ to be equal to its maximum opening amount value, i.e. to its value representing minimum amount of throttling of the intake manifold and passage 2 by the intake throttling butterfly valve 8, since the effect of this intake throttling is not in any case needed at this time, whatever may be the position in the phase space represented in FIG. 2 of the point representing the current operational condition of the diesel internal combustion engine 1. On the other hand, if the result of this decision is positive, i.e. if the soot catcher 5 does in fact need at this time to be purged, then the electrical control device 22 considers in which of the three above described regions of the phase space represented in FIG. 2 the point representing the current operational condition of the diesel internal combustion engine 1 currently lies, basing this consideration of course on the current value of engine load of the diesel internal combustion engine 1 as indicated to the electrical control device 22 by the electrical output signal from the engine load sensor 23 and the current value of engine revolution speed of the diesel internal combustion engine 1 as indicated to the electrical control device 22 by the electrical output signal from the engine revolution speed sensor 24. If said point representing the current operational condition of the diesel internal combustion engine 1 currently lies in the aforementioned first non intake throttling region of said phase space, i.e. in the uppermost region in FIG. 2 which represents sets of values for the operational parameters of the diesel internal combustion engine 1 (i.e. for the engine load and engine revolution speed of said diesel internal combustion engine (1) in the case of which minimum intake throttling for the diesel internal combustion engine 1 should be performed even if it may be desired to purge the soot catcher 5, i.e. in the case of which the intake throttling butterfly valve 8 even if it may be required to purge the soot catcher 5 should be positioned to its minimum intake throttling position in which it is rotated to the maximum amount in the clockwise direction in FIG. 1 by air at substantially atmospheric pressure being admitted to the diaphragm chamber 13 of the diaphragm actuator 10 so that purging of the soot catcher 5 cannot be at all performed in these operational conditions, then again the electrical control device sets the value $A_T$ to be equal to its maximum opening amount value, i.e. to its value representing minimum amount of throttling of the intake manifold and passage 2 by the intake throttling butterfly valve 8, since the current values of the engine operational parameters are such that the intake throttling effect, even if in principle needed at this time for purging the soot catcher 5 by heating up the exhaust gases of the diesel internal combustion engine 1, cannot be utilized at this time for reasons which are per se well known in the art to do with emission of smoke and soot in the exhaust gases of the diesel internal combustion engine 1 and with impairment of the operability and drivability of the diesel internal combustion engine 1; and if said point representing the current operational condition of the diesel internal combustion engine 1 currently lies in the aforementioned second intake throttling region, i.e. in the lowermost region in FIG. 2, which represents sets of values for the operational parameters of the diesel internal combustion engine 1 in the case of which maximum intake throttling for the diesel internal combustion engine 1 should be performed if purging of the soot catcher 5 is required, i.e. in the case of which for purging the soot catcher 5 the intake throttling butterfly valve 8 should be positioned to its maximum intake throttling position in which it is rotated to the maximum amount in the anticlockwise direction in FIG. 1 by a high amount of vacuum being admitted to the diaphragm chamber 13 of the diaphragm actuator 10, then the electrical control device sets $A_T$ to be equal to its minimum opening amount value representing maximum amount of throttling of the intake manifold and passage 2 by the intake throttling butterfly valve 8, since the current values of the engine operational parameters are such that the intake throttling effect may be utilized to the maximum amount at this time for for purging the soot catcher 5. On the other hand, if said point representing the current operational condition of the diesel internal combustion engine 1 currently lies in the aforementioned third or partial intake throttling region, i.e. currently falls in the intermediate region in FIG. 2, which represents sets of values for the operational parameters of the diesel internal combustion engine 1 in the case of which if it is desired to purge the soot catcher 5 a non maximum amount of intake throttling for the diesel internal combustion engine 1 should be performed, i.e. in the case of which the intake throttling butterfly valve 8 should be positioned to an intermediate intake throttling position in which it is rotated to an intermediate non maximum and non minimum amount in the anticlockwise direction in FIG. 1 by an intermediate amount of vacuum being admitted to the diaphragm chamber 13 of the diaphragm actuator 10, in order to purge the soot catcher 5 by heating up the exhaust of the diesel internal combustion engine 1 and by thus burning out the accumulation of combustible soot particles built up and lodged in said soot catcher 5, then the electrical control device sets $A_T$ to be equal to an intermediate value representing the appropriate intermediate amount of throttling of the intake manifold and passage 2 by the intake throttling butterfly valve 8 which are proper to be provided at this time, since as explained above the current values of the engine operational parameters are such that the full intake throttling effect, even if in principle needed at this time for purging the soot catcher 5 by heating up the exhaust gases of the diesel internal combustion engine 1, cannot be utilized at this time for reasons which are per se well known in the art to do with emission of smoke and soot in the exhaust gases of the diesel internal combustion engine 1 and with impairment of the operability and drivability of the diesel internal combustion engine 1, but on the other hand some intake throttling in order to purge the soot catcher 5 by heating up the exhaust of the diesel internal combustion engine 1 and by thus burning out the accumulation of combustible soot particles built up and lodged in said soot catcher 5 may be performed. Thus, the electrical control device 22 determines this intermediate target value for the quantity $A_T$ representing the target amount of opening of the intake throttling butterfly valve 8, based upon some process which is not relevant to the gist of the present invention.

Figure 2:
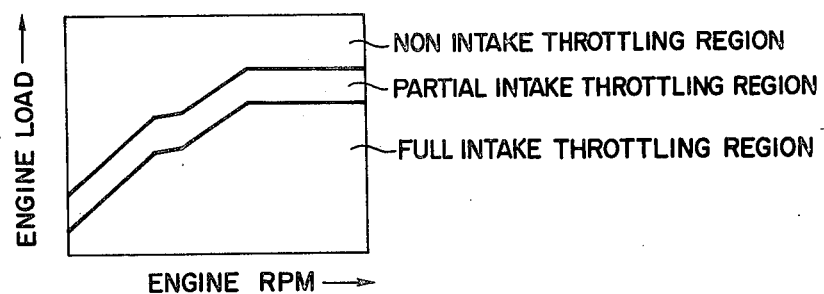
FIG. 2 is a diagrammatical illustration of a phase space for explaining the operation of said preferred embodiment of the intake throttling valve control method according to the present invention, in which engine load is shown along the vertical axis and engine revolution speed is shown along the horizontal axis, showing said phase space as divided into three regions, a maximum intake throttling region, a minimum intake throttling region, and a partial intake throttling region intermediate between said other two regions.
Figure 3:
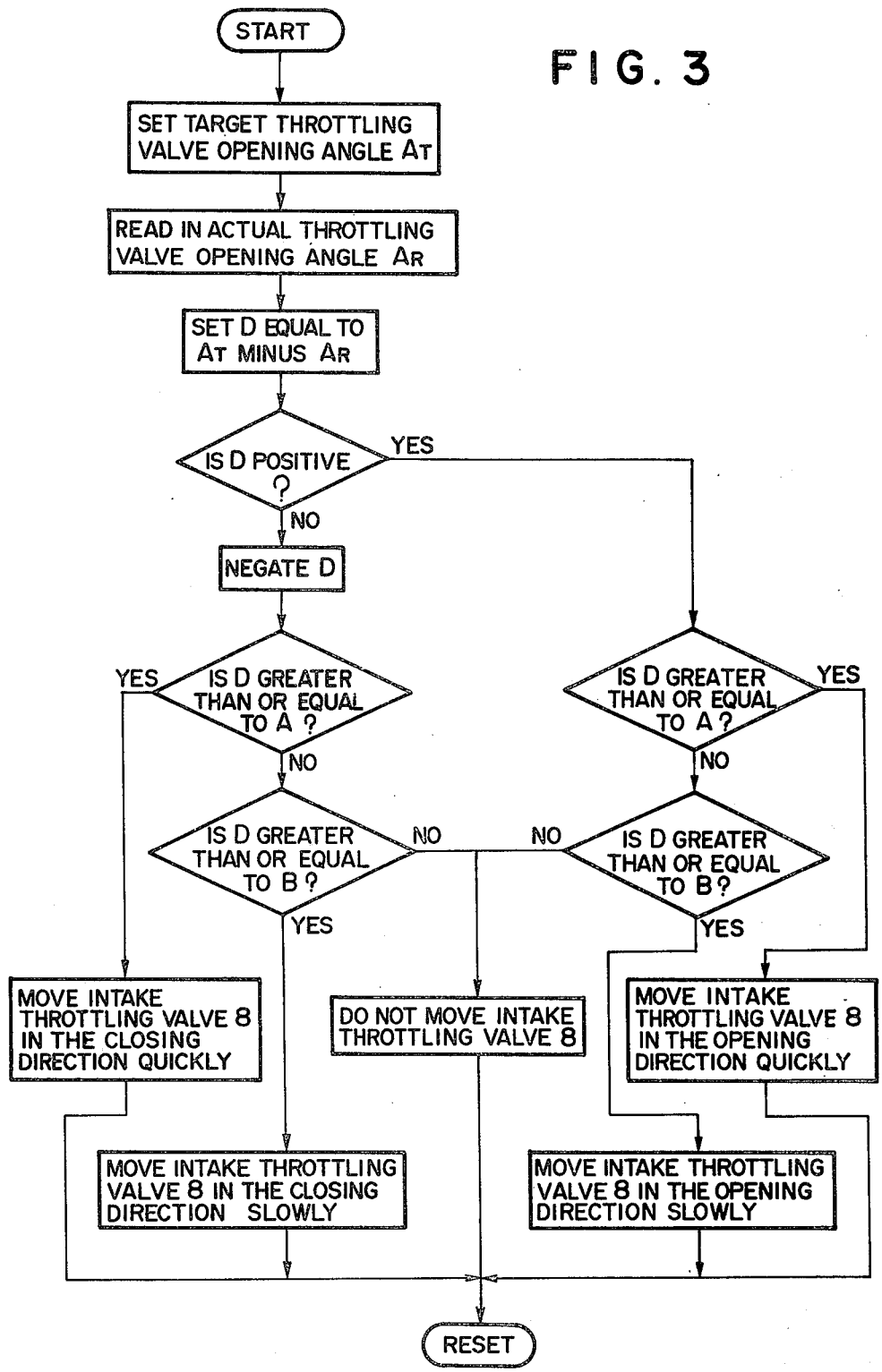
FIG. 3 is a flow chart, showing the operation of a computer program for a control device (which is a microcomputer) incorporated in the above mentioned preferred embodiment of the intake throttling valve control apparatus according to the present invention, for practicing the preferred embodiment of the intake throttling valve control method according to the present invention.

In fact, this intermediate value for $A_T$ may be performed by a process of table lookup from a table similar in configuration to the phase space diagram shown in FIG. 2, which table may also be convenient for determining in which of the three aforesaid regions of the phase space whose dimensions are engine load and engine revolution speed the point representing the current operational conditions of the diesel internal combustion engine 1 in fact lies. Various possible ways in which this table looking up could be organized will be evident to one of ordinary skill in the art, based upon the disclosures in this specification, and hence none of them will be described in detail herein. Further, after such a process of table lookup to determine the aforesaid intermediate value for the quantity $A_T$ representing the target amount of opening of the intake throttling butterfly valve 8, the electrical control device 22 may perform further corrections on this value $A_T$, in view of the current value of engine cooling water temperature, or the like. Again, this is not strictly relevant to the present invention: the only important fact is that this SET TARGET THROTTLING VALVE OPENING ANGLE $A_T$ block sets a target value for the opening amount of the intake throttling butterfly valve 8, said target value either representing a maximum opening amount, or a minimum opening amount, or an intermediate opening amount, for said intake butterfly valve 8. From this SET TARGET THROTTLING VALVE OPENING ANGLE $A_T$ block, the flow of control proceeds next to the READ IN ACTUAL THROTTLING VALVE OPENING ANGLE $A_R$ block.

In this READ IN ACTUAL THROTTLING VALVE OPENING ANGLE $A_R$ block, the electrical control device 22 reads in a value representing the actual amount of opening of the intake throttling butterfly valve 8, as indicated by the current value of the electrical signal from the intake throttling valve opening amount sensor 25. This value is stored in the variable $A_R$. From this block, the flow of control proceeds next to the SET D EQUAL TO $A_T$ MINUS $A_R$ block.

In this SET D EQUAL TO $A_T$ MINUS $A_R$ block, the electrical control device 22 calculates a value D representing the deviation of the actual amount $A_R$ of opening of the intake throttling butterfly valve 8, as just now indicated by the current value of the electrical signal from the intake throttling valve opening amount sensor 25, from the target value of said amount of opening of said intake throttling butterfly valve 8, as just now calculated as explained above by the electrical control device 22. The value D is positive, if the actual amount $A_R$ of opening of the intake throttling butterfly valve 8 is less than the target value of said amount of opening of said intake throttling butterfly valve 8, i.e. if the intake throttling butterfly valve 8 is more closed than it ought to be and too much throttling is being provided for the intake passage 2 of the diesel internal combustion engine 1 thereby; and the value D is negative, if the actual amount $A_R$ of opening of the intake throttling butterfly valve 8 is greater than the target value of said amount of opening of said intake throttling butterfly valve 8, i.e. if the intake throttling butterfly valve 8 is more open than it ought to be and too little throttling is being provided for the intake passage 2 of the diesel internal combustion engine 1 thereby. From this block, the flow of control proceeds next to the IS D POSITIVE? decision block.

In this IS D POSITIVE? decision block, a decision is made as to whether the value of D is positive, or not. Thus, this IS D POSITIVE? decision block serves to decide whether the actual amount $A_R$ of opening of the intake throttling butterfly valve 8 is less than the target value of said amount of opening of said intake throttling butterfly valve 8, i.e. if the intake throttling butterfly valve 8 is more closed than it ought to be and too much intake throttling is being provided for the intake passage 2 of the diesel internal combustion engine 1 thereby, or whether on the contrary the actual amount $A_R$ of opening of the intake throttling butterfly valve 8 is greater than the target value of said amount of opening of said intake throttling butterfly valve 8, i.e. if the intake throttling butterfly valve 8 is more open than it ought to be and too little intake throttling is being provided for the intake passage 2 of the diesel internal combustion engine 1 thereby. If the result of the decision in this IS D POSITIVE? decision block is NO, i.e. if the value of D is negative and therefore too little intake throttling is being provided for the intake passage 2 of the diesel internal combustion engine 1 by the intake throttling butterfly valve 8, then the flow of control passes to enter next the NEGATE D block, and otherwise if the result of the decision is this IS D POSITIVE? decision block is YES, i.e. if the value of D is positive and therefore too much intake throttling is being provided for the intake passage 2 of the diesel internal combustion engine 1 by the intake throttling butterfly valve 8, then the flow of control passes to enter next the first IS D GREATER THAN OR EQUAL TO A? decision block.

In the NO branch from this IS D POSITIVE? decision block, since it is decided at this point that the value of D is negative, therefore at this point certainly the amount of throttling for the intake passage 2 of the diesel internal combustion engine 1 by the intake throttling butterfly valve 8 is too little, and therefore now consideration should be made of just how much too small this current value of said throttling of the intake passage 2 actually is. Therefore, the flow of control passes to enter next the NEGATE D block.

In this NEGATE D block, the sign of D is altered, and thus now the current value of D becomes positive; in other words, D is now set to be equal to its absolute value. Now that the value of D has been set to the absolute value of the difference between the actual amount $A_R$ of opening of the intake throttling butterfly valve 8 and the target value of said amount of opening of said intake throttling butterfly valve 8, from this NEGATE D block, the flow of control passes to enter next the second IS D GREATER THAN OR EQUAL TO A? decision block.

On the other hand, in the YES branch from this IS D POSITIVE? decision block, since it is decided at this point that the value of D is positive, therefore at this point certainly the amount of throttling for the intake passage 2 of the diesel internal combustion engine 1 by the intake throttling butterfly valve 8 is too great, and therefore now consideration should be made of just how much too great this current value of said throttling of the intake passage 2 actually is. Therefore, the flow of control passes to enter next the first IS D GREATER THAN OR EQUAL TO A? decision block.

Now, first the sequence of events in the branch of the flow chart shown in FIG. 3 starting at this first IS D GREATER THAN OR EQUAL TO A? decision block will be explained; it should be remembered that at this point it has already been determined that D is positive.

In this first IS D GREATER THAN OR EQUAL TO A? decision block, a decision is made as to whether the value of D is greater than or equal to a first larger predetermined value A, or not. Thus, this first IS D GREATER THAN OR EQUAL TO A? decision block serves to decide whether the difference between the actual amount $A_R$ of opening of the intake throttling butterfly valve 8 and the target value of said amount $A_T$ of opening of said intake throttling butterfly valve 8 is larger than the predetermined value A, with as remarked before $A_T$ greater than $A_R$, or whether on the other hand the difference between the actual amount $A_R$ of opening of the intake throttling butterfly valve 8 and the target value of said amount of opening of said intake throttling butterfly valve 8 is smaller than the predetermined value A, still with as remarked before $A_T$ greater than $A_R$. If the result of the decision in this first IS D GREATER THAN OR EQUAL TO A? decision block is NO, i.e. if the value of the actual amount $A_R$ of opening of the intake throttling butterfly valve 8 is quite close to the target value $A_T$ of said amount of opening of said intake throttling butterfly valve 8, i.e. is within the range of the first predetermined value A near thereto, then the flow of control passes to enter next the first IS D GREATER THAN OR EQUAL TO B? decision block, and otherwise if the result of the decision in this first IS D GREATER THAN OR EQUAL TO A? decision block is YES, i.e. if the value of the actual amount $A_R$ of opening of the intake throttling butterfly valve 8 is not quite close to the target value $A_T$ of said amount of opening of said intake throttling butterfly valve 8, i.e. is outside the range of the first predetermined value A therefrom, then the flow of control passes to enter next the MOVE INTAKE THROTTLING VALVE 8 IN THE OPENING DIRECTION QUICKLY block.

Thus, in the NO branch from this first IS D GREATER THAN OR EQUAL TO A? decision block, since it is decided at this point that the value of the actual amount $A_R$ of opening of the intake throttling butterfly valve 8 is quite close to the target value $A_T$ of said amount of opening of said intake throttling butterfly valve 8, i.e. is closer thereto than the first predetermined value A, therefore at this point it should be decided whether or not in fact said value of the actual amount $A_R$ of opening of the intake throttling butterfly valve 8 is substantially equal to the target value $A_T$ of said amount of opening of said intake throttling butterfly valve 8, or not. Therefore, the flow of control passes to enter next the first IS D GREATER THAN OR EQUAL TO B? decision block.

In this first IS D GREATER THAN OR EQUAL TO B? decision block, a decision is made as to whether in fact the value of the actual amount $A_R$ of opening of the intake throttling butterfly valve 8 is within a relatively small amount B of the target value $A_T$ for said amount of opening of said intake throttling butterfly valve 8, or not. Thus, this first IS D GREATER THAN OR EQUAL TO B? decision block serves to decide whether the value of the actual amount $A_R$ of opening of the intake throttling butterfly valve 8 is substantially equal for control purposes to the target value $A_T$ for said amount of opening of said intake throttling butterfly valve 8, or not. If the result of the decision in this first IS D GREATER THAN OR EQUAL TO B? decision block is NO, i.e. if in fact the value of the actual amount $A_R$ of opening of the intake throttling butterfly valve 8 is substantially equal to the target value $A_T$ of said amount of opening of said intake throttling butterfly valve 8 for control purposes, then the flow of control passes to enter next the DO NOT MOVE INTAKE THROTTLING VALVE 8 block, and otherwise if the result of the decision in this first IS D GREATER THAN OR EQUAL TO B? decision block is YES, i.e. if the value of the actual amount $A_R$ of opening of the intake throttling butterfly valve 8 is not substantially equal to the target value $A_T$ of said amount of opening of said intake throttling butterfly valve 8, then the flow of control passes to enter next the MOVE INTAKE THROTTLING VALVE 8 IN THE OPENING DIRECTION SLOWLY block.

In the NO branch from this first IS D GREATER THAN OR EQUAL TO B? decision block, since it is decided at this point that the difference between the value of the actual amount $A_R$ of opening of the intake throttling butterfly valve 8 and the target value $A_T$ of said amount of opening of said intake throttling butterfly valve 8 is less than the relatively small value B which is taken as representing approximate equality, therefore at this point it is decided that no further adjustment is needed for the position of the intake throttling butterfly valve 8. Therefore, the flow of control passes to enter next the DO NOT MOVE INTAKE THROTTLING VALVE 8 block.

In this DO NOT MOVE INTAKE THROTTLING VALVE 8 block, in fact, it has been determined at this point in the flow chart of FIG. 3 that no further adjustment of the pressure value in the pressure chamber 13 of the diaphragm actuator 10 needs to be performed at this time, since the actual amount of intake throttling which is being provided for the intake manifold 2 of the diesel internal combustion engine 1 by the intake throttling butterfly valve 8, as indicated by the electrical output signal representing the amount of opening of said intake throttling butterfly valve 8 from the intake throttling valve position sensor 25 corresponding to the value designated by $A_R$, is approximately (within the relatively small limit B on either side) equal to the target value for intake throttling corresponding to the value designated by $A_T$ which has been calculated by the electrical control device 22 as being desirable. Thus, the electrical control device 22, in this DO NOT MOVE INTAKE THROTTLING VALVE 8 block, outputs a first electrical output signal of substantially zero pulse ratio, i.e. substantially a steady OFF signal, for controlling the operation of the first electrically actuated switching valve 17, and also outputs a second electrical output signal of substantially zero pulse ratio, i.e. substantially a steady OFF signal, for controlling the operation of the second electrically actuated switching valve 20. Thus both the first electrically actuated switching valve 17 and the second electrically actuated switching valve 20 are kept substantially always closed, and accordingly the vacuum value in the pressure chamber 13 of the diaphragm actuator 10 is substantially left unaltered, thus leaving the amount of intake throttling which is being provided for the intake manifold 2 of the diesel internal combustion engine 1 by the intake throttling butterfly valve 8 substantially unaltered. From this DO NOT MOVE INTAKE THROTTLING VALVE 8 block, the flow of control passes to enter next the RESET block, which ends this iteration of the control program for the electrical control device 22 which is shown in FIG. 3.

On the other hand, in the YES branch from this first IS D GREATER THAN OR EQUAL TO B? decision block, since it is decided at this point that the value of the actual amount $A_R$ of opening of the intake throttling butterfly valve 8 is not substantially equal to the target value $A_T$ of said amount of opening of said intake throttling butterfly valve 8, but as mentioned above is in fact below but not very far away from said target value, since the absolute value of the difference between them is greater than or equal to the lesser value B which indicates substantial equality but is less than the larger value A, therefore according to the basic principle of the present invention at this point the value of the actual amount $A_R$ of opening of the intake throttling butterfly valve 8 should be brought towards the target value $A_T$ of said amount of opening of said intake throttling butterfly valve 8 relatively rather slowly, and accordingly the flow of control passes to enter next the MOVE INTAKE THROTTLING VALVE 8 IN THE OPENING DIRECTION SLOWLY block.

In this MOVE INTAKE THROTTLING VALVE 8 IN THE OPENING DIRECTION SLOWLY block, in fact, it has been determined at this point in the flow chart of FIG. 3 that the pressure value in the pressure chamber 13 of the diaphragm actuator 10 needs to be, at this time, increased relatively slowly, according to the principle of the present invention, since the actual amount of intake throttling which is being provided for the intake manifold 2 of the diesel internal combustion engine 1 by the intake throttling butterfly valve 8, which is indicated by the electrical output signal from the intake throttling valve position sensor 25, and which corresponds to the actual opening amount value for the intake throttling butterfly valve 8 designated by $A_R$, is not approximately equal to the target value for such intake throttling which has been calculated by the electrical control device 22 as being desirable, and which corresponds to the target opening amount value for the intake throttling butterfly valve 8 designated by $A_T$, but on the other hand said actual intake throttling valve opening amount $A_R$ is within the relatively large value A of said target value for said intake throttling valve opening amount $A_T$; said actual intake throttling amount being thus somewhat greater than said target intake throttling amount, according to the fact, already determined, that the actual intake throttle opening amount value $A_R$ is somewhat less than the target intake throttle opening amount value $A_T$. Thus, in this preferred embodiment of the intake throttling valve control method and apparatus according to the present invention, the electrical control device 22, in this MOVE INTAKE THROTTLING VALVE 8 IN THE OPENING DIRECTION SLOWLY block, outputs a first electrical output signal of substantially zero pulse ratio, i.e. substantially a steady OFF signal, for controlling the operation of the first electrically actuated switching valve 17, and a second electrical output signal of relatively low pulse ratio for controlling the operation of the second electrically actuated switching valve 20. Thus the first electrically actuated switching valve 17 is substantially always closed, thus interrupting the flow of the vacuum produced by the vacuum pump 15 therethrough to the diaphragm chamber 13 of the diaphragm actuator 10 via the T junction 26, while on the other than the second electrically actuated switching valve 20 is opened for a relatively small proportion of the time, thus allowing atmospheric air to flow through said second electrically actuated switching valve 20 to the diaphragm chamber 13 of the diaphragm actuator 10 via the T junction 26 at a relatively small flow speed; and accordingly the vacuum value in the pressure chamber 13 of the diaphragm actuator 10 is lowered at a relatively small speed (i.e. the amount of depression of the vacuum value in said diaphragm chamber 13 below the current value of atmospheric pressure is lowered), thus gradually increasing the opening amount of the intake throttling butterfly valve 8 at a relatively slow speed, thus gradually decreasing the amount of intake throttling which is being provided for the intake manifold 2 of the diesel internal combustion engine 1 by the intake throttling butterfly valve 8 at a relatively slow speed. In fact, in the shown and described preferred embodiment of the method and apparatus according to the present invention, it is so arranged that this relatively low rate of increase of the opening of the intake throttling butterfly valve 8 is substantially constant in all circumstances; but this is not to be taken as limitative of the present invention. From this MOVE INTAKE THROTTLING VALVE 8 IN THE OPENING DIRECTION SLOWLY block, the flow of control passes to enter next the RESET block, which ends this iteration of the control program for the electrical control device 22 which is shown in FIG. 3.

On the other hand, in the YES branch from the first IS D GREATER THAN OR EQUAL TO A? decision block, since it is decided at this point that the value of the actual amount $A_R$ of opening of the intake throttling butterfly valve 8 is not even quite close to the target value $A_T$ of said amount of opening of said intake throttling butterfly valve 8, i.e. is not so close thereto as the first predetermined value A, therefore at this point according to the basic principle of the present invention the intake throttling butterfly valve 8 should be quickly opened, so as quickly to diminish the amount of intake throttling being provided for the diesel internal combustion engine 1. This is because at the present time the actual amount of intake throttling for the diesel internal combustion engine 1 which is being provided is very substantially too great. Therefore, the flow of control passes to enter next the MOVE INTAKE THROTTLING VALVE 8 IN THE OPENING DIRECTION QUICKLY block.

In this MOVE INTAKE THROTTLING VALVE 8 IN THE OPENING DIRECTION QUICKLY block, in fact, it has been determined at this point in the flow chart of FIG. 3 that the pressure value in the pressure chamber 13 of the diaphragm actuator 10 needs to be, at this time, increased relatively quickly, according to the principle of the present invention, since the actual amount of intake throttling which is being provided for the intake manifold 2 of the diesel internal combustion engine 1 by the intake throttling butterfly valve 8, which is indicated by the electrical output signal from the intake throttling valve position sensor 25, and which corresponds to the actual opening amount value for the intake throttling butterfly valve 8 designated by $A_R$, is not approximately equal to the target value for such intake throttling which has been calculated by the electrical control device 22 as being desirable, and which corresponds to the target opening amount value for the intake throttling butterfly valve 8 designated by $A_T$, and further said actual throttling valve opening amount $A_R$ is not even within the relatively large value A of said target value for said throttling valve opening amount $A_T$; said actual intake throttling amount being greater than said target intake throttling amount, according to the fact, already determined, that the actual intake throttle opening amount value $A_R$ is much less than the target intake throttle opening amount value $A_T$. Thus, in this preferred embodiment of the intake throttling valve control method and apparatus according to the present invention, the electrical control device 22, in this MOVE INTAKE THROTTLING VALVE 8 IN THE OPENING DIRECTION QUICKLY block, outputs a first electrical output signal of substantially zero pulse ratio, i.e. substantially a steady OFF signal, for controlling the operation of the first electrically actuated switching valve 17, and a second electrical output signal of relatively high pulse ratio for controlling the operation of the second electrically actuated switching valve 20. Thus the first electrically actuated switching valve 17 is substantially always closed, thus interrupting the flow of the vacuum produced by the vacuum pump 15 therethrough to the diaphragm chamber 13 of the diaphragm actuator 10 via the T junction 26, while on the other hand the second electrically actuated switching valve 20 is opened for a relatively large proportion of the time, thus allowing atmospheric air to flow through said second electrically actuated switching valve 20 to the diaphragm chamber 13 of the diaphragm actuator 10 via the T junction 26 at a relatively high flow speed; and accordingly the vacuum value in the pressure chamber 13 of the diaphragm actuator 10 is lowered at a relatively high speed (i.e. the amount of depression of the vacuum value in said diaphragm chamber 13 below the current value of atmospheric pressure is lowered), thus gradually increasing the opening amount of the intake throttling butterfly valve 8 at a relatively high speed, thus gradually decreasing the amount of intake throttling which is being provided for the intake manifold 2 of the diesel internal combustion engine 1 by the intake throttling butterfly valve 8 at a relatively high speed. In fact, in the shown and described preferred embodiment of the method and apparatus according to the present invention, it is so arranged that this relatively high rate of increase of the opening of the intake throttling butterfly valve 8 is substantially constant in all circumstances; but this is not to be taken as limitative of the present invention. From this MOVE INTAKE THROTTLING VALVE 8 IN THE OPENING DIRECTION QUICKLY block, the flow of control passes to enter next the RESET block, which ends this iteration of the control program for the electrical control device 22 which is shown in FIG. 3.

Next, the sequence of events in the branch of the flow chart shown in FIG. 3 starting at this second IS D GREATER THAN OR EQUAL TO A? decision block, after the NEGATE D block, will be explained. It should be remembered that at this point it was first determined that D was positive, and then D was negated so as to be set to be positive.

In this second IS D GREATER THAN OR EQUAL TO A? decision block, a decision is made as to whether the value of D is greater than or equal to the first larger predetermined value A, or not. Thus, this second IS D GREATER THAN OR EQUAL TO A? decision block serves to decide whether the difference between the actual amount $A_R$ of opening of the intake throttling butterfly valve 8 and the target value of said amount $A_T$ of opening of said intake throttling butterfly valve 8 is larger than the predetermined value A, with on the contrary to what was remarked before $A_T$ less than $A_R$, or whether on the other hand the difference between the actual amount $A_R$ of opening of the intake throttling butterfly valve 8 and the target value of said amount of opening of said intake throttling butterfly valve 8 is smaller than the predetermined value A, still with as remarked before $A_T$ less than $A_R$. If the result of the decision in this second IS D GREATER THAN OR EQUAL TO A? decision block is NO, i.e. if the value of the actual amount $A_R$ of opening of the intake throttling butterfly valve 8 is quite close to the target value $A_T$ of said amount of opening of said intake throttling butterfly valve 8, i.e. is within the range of the first predetermined value A near thereto, then the flow of control passes to enter next the second IS D GREATER THAN OR EQUAL TO B? decision block, and otherwise if the result of the decision in this second IS D GREATER THAN OR EQUAL TO A? decision block is YES, i.e. if the value of the actual amount $A_R$ of opening of the intake throttling butterfly valve 8 is not quite close to the target value $A_T$ of said amount of opening of said intake throttling butterfly valve 8, i.e. is outside the range of the first predetermined value A therefrom, then the flow of control passes to enter next the MOVE INTAKE THROTTLING VALVE 8 IN THE CLOSING DIRECTION QUICKLY block.

Thus, in the NO branch from this second IS D GREATER THAN OR EQUAL TO A? decision block, since it is decided at this point that the value of the actual amount $A_R$ of opening of the intake throttling butterfly valve 8 is quite close to the target value $A_T$ of said amount of opening of said intake throttling butterfly valve 8, i.e. is closer thereto than the first predetermined value A, therefore at this point it should be decided whether or not in fact said value of the actual amount $A_R$ of opening of the intake throttling butterfly valve 8 is substantially equal to the target value $A_T$ of said amount of opening of said intake throttling butterfly valve 8, or not. Therefore, the flow of control passes to enter next the second IS D GREATER THAN OR EQUAL TO B? decision block.

In this second IS D GREATER THAN OR EQUAL TO B? decision block, a decision is made as to whether in fact the value of the actual amount $A_R$ of opening of the intake throttling butterfly valve 8 is within the same aforementioned second predetermined relatively small amount B of the target value $A_T$ for said amount of opening of said intake throttling butterfly valve 8, or not. Thus, this second IS D GREATER THAN OR EQUAL TO B? decision block serves to decide whether the value of the actual amount $A_R$ of opening of the intake throttling butterfly valve 8 is substantially equal for control purposes to the target value $A_T$ for said amount of opening of said intake throttling butterfly valve 8, or not. If the result of the decision in this second IS D GREATER THAN OR EQUAL TO B? decision block is NO, i.e. if in fact the value of the actual amount $A_R$ of opening of the intake throttling butterfly valve 8 is substantially equal to the target value $A_T$ of said amount of opening of said intake throttling butterfly valve 8 for control purposes, then the flow of control again passes to enter next the previously described and explained DO NOT MOVE INTAKE THROTTLING VALVE 8 block, and otherwise if the result of the decision in this second IS D GREATER THAN OR EQUAL TO B? decision block is YES, i.e. if the value of the actual amount $A_R$ of opening of the intake throttling butterfly valve 8 is not substantially equal to the target value $A_T$ of said amount of opening of said intake throttling butterfly valve 8, then the flow of control passes to enter next the MOVE INTAKE THROTTLING VALVE 8 IN THE CLOSING DIRECTION SLOWLY block.

In the NO branch from this second IS D GREATER THAN OR EQUAL TO B? decision block, since it is decided at this point that the difference between the value of the actual amount $A_R$ of opening of the intake throttling butterfly valve 8 and the target value $A_T$ of said amount of opening of said intake throttling butterfly valve 8 is less than the relatively small value B which is taken as representing approximate equality, therefore at this point it is decided that no further adjustment is needed for the position of the intake throttling butterfly valve 8. Therefore, the flow of control passes to enter next the DO NOT MOVE INTAKE THROTTLING VALVE 8 block.

In this DO NOT MOVE INTAKE THROTTLING VALVE 8 block, as before, it has been determined at this point in the flow chart of FIG. 3 that no further adjustment of the pressure value in the pressure chamber 13 of the diaphragm actuator 10 needs to be performed at this time, since the actual amount of intake throttling which is being provided for the intake manifold 2 of the diesel internal combustion engine 1 by the intake throttling butterfly valve 8, as indicated by the electrical output signal representing the amount of opening of said intake throttling butterfly valve 8 from the intake throttling valve position sensor 25 corresponding to the value designated by $A_R$, is approximately (within the relatively small limit B on either side) equal to the target value for intake throttling corresponding to the value designated by $A_T$ which has been calculated by the electrical control device 22 as being desirable. Thus, again, the electrical control device 22, in this DO NOT MOVE INTAKE THROTTLING VALVE 8 block, outputs a first electrical output signal of substantially zero pulse ratio, i.e. substantially a steady OFF signal, for controlling the operation of the first electrically actuated switching valve 17, and also outputs a second electrical output signal of substantially zero pulse ratio, i.e. substantially a steady OFF signal, for controlling the operation of the second electrically actuated switching valve 20. Thus both the first electrically actuated switching valve 17 and the second electrically actuated switching valve 20 are kept substantially always closed, and accordingly the vacuum value in the pressure chamber 13 of the diaphragm actuator 10 is substantially left unaltered, thus leaving the amount of intake throttling which is being provided for the intake manifold 2 of the diesel internal combustion engine 1 by the intake throttling butterfly valve 8 substantially unaltered. From this DO NOT MOVE INTAKE THROTTLING VALVE 8 block, the flow of control again passes to enter next the RESET block, which ends this iteration of the control program for the electrical control device 22 which is shown in FIG. 3.

On the other hand, in the YES branch from this second IS D GREATER THAN OR EQUAL TO B? decision block, since it is decided at this point that the value of the actual amount $A_R$ of opening of the intake throttling butterfly valve 8 is not substantially equal to the target value $A_T$ of said amount of opening of said intake throttling butterfly valve 8, but as mentioned above is in fact above but not very far away from said target value, since the absolute value of the difference between them is greater than or equal to the lesser predetermined value B which indicates substantial equality but is less than the larger predetermined value A, therefore according to the basic principle of the present invention at this point the value of the actual amount $A_R$ of opening of the intake throttling butterfly valve 8 should be brought towards the target value $A_T$ of said amount of opening of said intake throttling butterfly valve 8 relatively rather slowly, and accordingly the flow of control passes to enter next the MOVE INTAKE THROTTLING VALVE 8 IN THE CLOSING DIRECTION SLOWLY block.

In this MOVE INTAKE THROTTLING VALVE 8 IN THE CLOSING DIRECTION SLOWLY block, in fact, it has been determined at this point in the flow chart of FIG. 3 that the pressure value in the pressure chamber 13 of the diaphragm actuator 10 needs to be, at this time, decreased relatively slowly, according to the principle of the present invention, since the actual amount of intake throttling which is being provided for the intake manifold 2 of the diesel internal combustion engine 1 by the intake throttling butterfly valve 8, which is indicated by the electrical output signal from the intake throttling valve position sensor 25, and which corresponds to the actual opening amount value for the intake throttling butterfly valve 8 designated by $A_R$, is not approximately equal to the target value for such intake throttling which has been calculated by the electrical control device 22 as being desirable, and which corresponds to the target opening amount value for the intake throttling butterfly valve 8 designated by $A_T$, but on the other hand said actual intake throttling valve opening amount $A_R$ is within the relatively large value A of said target value for said intake throttling valve opening amount $A_T$; said actual intake throttling amount being thus somewhat less than said target intake throttling amount, according to the fact, already determined, that the actual intake throttle opening amount value $A_R$ is somewhat greater than the target intake throttle opening amount value $A_T$. Thus, in this preferred embodiment of the intake throttling valve control method and apparatus according to the present invention, the electrical control device 22, in this MOVE INTAKE THROTTLING VALVE 8 IN THE CLOSING DIRECTION SLOWLY block, outputs a second electrical output signal of substantially zero pulse ratio, i.e. substantially a steady OFF signal, for controlling the operation of the second electrically actuated switching valve 20, and a first electrical output signal of relatively low pulse ratio for controlling the operation of the first electrically actuated switching valve 17. Thus the second electrically actuated switching valve 20 is substantially always closed, thus interrupting the flow of atmospheric air therethrough to the diaphragm chamber 13 of the diaphragm actuator 10 via the T junction 26, while on the other hand the first electrically actuated switching valve 17 is opened for a relatively small proportion of the time, thus allowing flow of the vacuum produced by the vacuum pump 15 through said first electrically actuated switching valve 17 to the diaphragm chamber 13 of the diaphragm actuator 10 via the T junction 26 at a relatively small flow speed; and accordingly the vacuum value in the pressure chamber 13 of the diaphragm actuator 10 is increased at a relatively small speed (i.e. the amount of depression of the vacuum value in said diaphragm chamber 13 below the current value of atmospheric pressure is increased), thus gradually decreasing the opening amount of the intake throttling butterfly valve 8 at a relatively slow speed, thus gradually increasing the amount of intake throttling which is being provided for the intake manifold 2 of the diesel internal combustion engine 1 by the intake throttling butterfly valve 8 at a relatively slow speed. In fact, in the shown and described preferred embodiment of the method and apparatus according to the present invention, it is so arranged that this relatively low rate of increase of the opening of the intake throttling butterfly valve 8 is substantially constant in all circumstances, being also equal in magnitude to the previously mentioned relatively low rate of increase of the opening of the intake throttling butterfly valve 8; but this is not to be taken as limitative of the present invention. From this MOVE INTAKE THROTTLING VALVE 8 IN THE CLOSING DIRECTION SLOWLY block, the flow of control passes to enter next the RESET block, which ends this iteration of the control program for the electrical control device 22 which is shown in FIG. 3.

On the other hand, in the YES branch from the second IS D GREATER THAN OR EQUAL TO A? decision block, since it is decided at this point that the value of the actual amount $A_R$ of opening of the intake throttling butterfly valve 8 is not even quite close to the target value $A_T$ of said amount of opening of said intake throttling butterfly valve 8, i.e. is not so close thereto as the first predetermined value A, therefore at this point according to the basic principle of the present invention the intake throttling butterfly valve 8 should be quickly close, so as quickly to increase the amount of intake throttling being provided for the diesel internal combustion engine 1. This is because at the present time the actual amount of intake throttling for the diesel internal combustion engine 1 which is being provided is very substantially too little. Therefore, the flow of control passes to enter next the MOVE INTAKE THROTTLING VALVE 8 IN THE CLOSING DIRECTION QUICKLY block.

In this MOVE INTAKE THROTTLING VALVE 8 IN THE CLOSING DIRECTION QUICKLY block, in fact, it has been determined at this point in the flow chart of FIG. 3 that the pressure value in the pressure chamber 13 of the diaphragm actuator 10 needs to be, at this time, decreased relatively quickly, according to the principle of the present invention, since the actual amount of intake throttling which is being provided for the intake manifold 2 of the diesel internal combustion engine 1 by the intake throttling butterfly valve 8, which is indicated by the electrical output signal from the intake throttling valve position sensor 25, and which corresponds to the actual opening amount value for the intake throttling butterfly valve 8 designated by $A_R$, is not approximately equal to the target value for such intake throttling which has been calculated by the electrical control device 22 as being desirable, and which corresponds to the target opening amount value for the intake throttling butterfly valve 8 designated by $A_T$, and further said actual throttling valve opening amount $A_R$ is not even within the relatively large value A of said target value for said throttling valve opening amount $A_T$; said actual intake throttling amount being much less than said target intake throttling amount, according to the fact, already determined, that the actual intake throttle opening amount value $A_R$ is much greater than the target intake throttle opening amount value $A_T$. Thus, in this preferred embodiment of the intake throttling valve control method and apparatus according to the present invention, the electrical control device 22, in this MOVE INTAKE THROTTLING VALVE 8 IN THE CLOSING DIRECTION QUICKLY block, outputs a second electrical output signal of substantially zero pulse ratio, i.e. substantially a steady OFF signal, for controlling the operation of the second electrically actuated switching valve 20, and a first electrical output signal of relatively high pulse ratio for controlling the operation of the first electrically actuated switching valve 17. Thus the second electrically actuated switching valve 20 is substantially always closed, thus interrupting the flow of atmospheric air therethrough to the diaphragm chamber 13 of the diaphragm actuator 10 via the T junction 26, while on the other hand the first electrically actuated switching valve 17 is opened for a relatively large proportion of the time, thus allowing flow of the vacuum produced by the vacuum pump 15 through said first electrically actuated switching valve 17 to the diaphragm chamber 13 of the diaphragm actuator 10 via the T junction 26 at a relatively high flow speed; and accordingly the vacuum value in the pressure chamber 13 of the diaphragm actuator 10 is increased at a relatively high speed (i.e. the amount of depression of the vacuum value in said diaphragm chamber 13 below the current value of atmospheric pressure is increased), thus gradually decreasing the opening amount of the intake throttling butterfly valve 8 at a relatively high speed, thus gradually increasing the amount of intake throttling which is being provided for the intake manifold 2 of the diesel internal combustion engine 1 by the intake throttling butterfly valve 8 at a relatively high speed. In fact, in the shown and described preferred embodiment of the method and apparatus according to the present invention, it is so arranged that this relatively high rate of decrease of the opening of the intake throttling butterfly valve 8 is substantially constant in all circumstances, being also equal in magnitude to the previously mentioned relatively high rate of increase of the opening of the intake throttling butterfly valve 8; but this is not to be taken as limitative of the present invention. From this MOVE INTAKE THROTTLING VALVE 8 IN THE CLOSING DIRECTION QUICKLY block, the flow of control passes to enter next the RESET block, which ends this iteration of the control program for the electrical control device 22 which is shown in FIG. 3.

Now, in summary, the advantage of the present invention described above is that, when the point which represents the current operational condition of the diesel internal combustion engine 1 moves in the phase space whose dimensions are engine load and engine revolution speed in such a way that the amount of opening of the intake throttling butterfly valve 8 ought to vary, either increasing or decreasing, when intake throttling is being performed in order to purge the soot catcher 5, then by proper control of the motion of said intake throttling butterfly valve the operation of said intake throttling valve 8 to throttle said air intake passage 2 and thereby to heat up the exhaust gases of said diesel internal combustion engine 1 so as to purge said soot catcher 5 by causing the combustion of soot particles which have accumulated in it is performed to the proper amount, without any substantial danger of hunting or overshooting. Thereby it is avoided that undue smoke and soot should be generated during the operation of the diesel internal combustion engine 1, especially during sharp acceleration episodes thereof, of which otherwise there might be a danger. This is very beneficial for improving the drivability and operability of the diesel internal combustion engine 1, as well as for preserving the quality of the exhaust emissions thereof.

Yet further, although in the shown preferred embodiment the engine operational parameters that were used to define the aforesaid phase space within which the intake throttling, the non intake throttling, and the partial intake throttling regions were defined were engine load and engine revolution speed, in fact this is not to be considered as a limitation of the present invention. A different and/or more complicated phase space could be considered; for example, engine cooling water temperature could be a third dimension of such a phase space. However, the utilization of engine load and engine revolution speed only as the two dimensions of a two dimensional phase space makes for ease of computation and of implementation of the process for determination of the target value for intake throttling valve opening amount $A_T$ which has been described above. Further, the fact that the advantages explained above are gained by a particularly simple procedure, in which as explained the discrimination regarding the amount of difference between said actual value $A_R$ of the opening of said intake throttling valve and said target value $A_T$ for the opening of said intake throttling valve is a simple one relating to said difference simply being greater or less than said certain predetermined value A, means that thereby the easy applicability of the method and apparatus according to the present invention is promoted. However, of course, this feature is also not to be taken as limitative of the present invention, but is a useful specialization thereof. Yet further, the fact that the advantages explained above are gained by an even more particularly simple procedure, in which also the setting of the actual rate of change of said actual opening amount of said intake throttling valve also is particularly simple, since substantially only two values are involved to which said rate of change is to be set, means that thereby the easy applicability of the method and apparatus according to the present invention is further promoted. However, of course, this feature is also not to be taken as limitative of the present invention, but is a useful further specialization thereof.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims which follow.

What is claimed is:

1. In a diesel internal combustion engine including an exhaust system having a soot particle catcher, an intake manifold and an air throttle valve positioned in said intake manifold for throttling the flow of air through said intake manifold and for raising the temperature of exhaust gases flowing through said exhaust system to purge said soot particle catcher by incineration, a method of controlling the throttle valve, said method comprising repeatedly performing the steps of:

measuring the load of said engine;
measuring the revolution speed of said engine;
measuring an opening degree of said throttle valve;
determining a target throttle opening degree based upon the measured revolution speed and load of the engine;
comparing the target throttle opening degree with the measured throttle opening degree, so as to generate a difference value;
increasing the opening degree of said throttle valve for a positive measured difference value, at a speed proportional to the size of said positive difference value; and
decreasing the throttle valve opening degree for a negative difference value, at a speed proportional to the absolute value of said negative difference value.

2. In a diesel internal combustion engine including an exhaust system having a soot particle catcher, an intake manifold, and an air throttle valve positioned in said intake manifold for throttling the flow of air through said intake manifold and for raising the temperature of exhaust gases flowing through said exhaust system so as to purge said soot particle catcher by incineration, a system for controlling said throttle valve, said system comprising:

(a) an engine load sensor which responds to the load of the engine and outputs an engine load electrical signal representative of the load of the engine;
(b) an engine revolution speed sensor which responds to the revolution speed of the engine and outputs an engine revolution speed electrical signal representative of the revolution speed of the engine;
(c) a throttle opening degree sensor which responds to the opening degree of said throttle valve and outputs a throttle opening degree electrical signal representative of the throttle opening degree of said throttle valve; and
(d) an electronic computer connected to said engine load sensor to receive said engine load electrical signal, connected to said engine revolution speed sensor to receive said engine revolution speed electrical signal and connected to said throttle opening degree sensor to receive said throttle opening degree electrical signal, said electric computer further being connected to said throttle valve for controlling the position of said throttle valve, said electronic computer including means for controlling said throttle valve as a function of the following repeated sequence:
(d1) determining a target throttle opening degree, based upon said engine load electrical signal and said engine revolution speed electrical signal,
(d2) calculating a difference value between the target throttle opening degree and the actual throttle opening degree, and determining whether this difference value is positive or negative,
(d3) actuating the throttle valve towards a fully opened opening degree at a speed corresponding to a positive difference value,
(d4) actuating said throttle valve towards a fully closed opening degree at a speed corresponding to the absolute value of a negative difference value.

* * * * *